(12) United States Patent
Peterson et al.

(10) Patent No.: US 11,429,637 B2
(45) Date of Patent: Aug. 30, 2022

(54) OFFLINE SUPPORT FOR A DATABASE CLUSTER

(71) Applicant: Microsoft Technology Licensing, LLC, Redmond, WA (US)

(72) Inventors: Michel Peterson, Ramat Gan (IL); Guy Lewin, New York City, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/069,485

(22) Filed: Oct. 13, 2020

(65) Prior Publication Data

US 2022/0114191 A1 Apr. 14, 2022

(51) Int. Cl.
*G06F 16/27* (2019.01)
*G06F 16/23* (2019.01)
*H04L 41/12* (2022.01)
*H04L 67/10* (2022.01)

(52) U.S. Cl.
CPC .......... *G06F 16/27* (2019.01); *G06F 16/2372* (2019.01); *H04L 41/12* (2013.01); *H04L 67/10* (2013.01)

(58) Field of Classification Search
CPC ......... H04L 41/12; H04L 67/10; G06F 16/27; G06F 16/2372
USPC .......................................................... 707/636
See application file for complete search history.

(56) References Cited

U.S. PATENT DOCUMENTS

| | | | |
|---|---|---|---|
| 6,683,858 B1* | 1/2004 | Chu | H04L 12/6418 370/263 |
| 2004/0122870 A1 | 6/2004 | Park et al. | |
| 2012/0163603 A1* | 6/2012 | Abe | H04L 67/2847 380/278 |
| 2012/0290531 A1* | 11/2012 | Kallakuri | G06F 16/27 707/610 |
| 2014/0164831 A1 | 6/2014 | Merriman et al. | |
| 2016/0242658 A1* | 8/2016 | Lisogurski | A61B 5/02416 |
| 2016/0350357 A1 | 12/2016 | Palmer | |

FOREIGN PATENT DOCUMENTS

CN 107846309 A 3/2018

OTHER PUBLICATIONS

"International Search Report and Written Opinion Issued in PCT Application No. PCT/US21/043100", dated Nov. 11, 2021, 12 Pages.

* cited by examiner

*Primary Examiner* — Wing F Chan
*Assistant Examiner* — Leon Y Tseng
(74) *Attorney, Agent, or Firm* — Wade IP Law PLLC

(57) ABSTRACT

Techniques are described herein that are capable of providing offline support for a database cluster that includes online nodes and an offline-compatible node. For example, an operation may be performed with regard to information, which is stored by the offline-compatible node while the offline-compatible node is not connected to the online nodes via the network, based at least in part on the offline-compatible node being connected to the online nodes. In another example, an operation may be performed with regard to information, which is stored by any one or more of the online nodes while the offline-compatible node is not connected to the online nodes via the network, based at least in part on the offline-compatible node being connected to the online nodes.

21 Claims, 7 Drawing Sheets

OFFLINE SUPPORT FOR A DATABASE CLUSTER

BACKGROUND

Databases often are hosted by multiple nodes (e.g., servers). The nodes may be grouped into database clusters such that each database cluster includes a subset of the nodes. The nodes in each database cluster traditionally are synchronized to store the same information or shards thereof. The database clusters typically are geographically distributed in an effort to reduce a likelihood that issues negatively affecting a given database cluster will negatively affect the other database clusters.

A cluster traditionally includes a primary node and secondary node(s). New or changed information that is to be stored by the cluster is usually directed to the primary node, and the primary node replicates the changes to the secondary node(s). If a node in the cluster fails (e.g., loses a connection with the other nodes in the cluster), the node typically is rebuilt from scratch, which may result in consumption of substantial time and resources.

SUMMARY

Various approaches are described herein for, among other things, providing offline support for a database cluster. For instance, the database cluster may include online nodes and one or more offline-compatible nodes. Online nodes are nodes that are synchronized with each other to store respective instances of information. An offline-compatible node in a database cluster is a node that is capable of performing an operation (a.k.a. task) with regard to information, which is stored by the offline compatible node while the offline compatible node is not connected to online nodes in the database cluster via a network, in response to (e.g., based on) the offline-compatible node being (e.g., becoming) connected to the online nodes via the network.

For example, the offline-compatible node may be capable of replicating information stored by the offline-compatible node to one or more of the online nodes and/or information stored by the online nodes to the offline-compatible node in response to the offline-compatible node being connected to the online nodes via a network. In an aspect of this example, information that is generated or received for storage by the offline-compatible node while the offline-compatible node is not connected to the online nodes via the network may be replicated to one or more of the online nodes based on (e.g., based at least in part on) the offline-compatible node being connected to the online nodes. In another aspect of this example, information that is generated or received for storage by any one or more of the online nodes while the offline-compatible node is not connected to the online nodes via the network may be replicated to the offline-compatible node based on the offline-compatible node being connected to the online nodes. In another example, the offline-compatible node may be capable of performing a CRUD operation on information stored by the offline-compatible node and/or causing a CRUD operation to be performed on information stored by the online nodes in response to the offline-compatible node being connected to the online nodes via a network. A CRUD operation is a create, read (a.k.a. retrieve), update (a.k.a. modify), or delete (a.k.a. destroy) operation. The read, update, and delete operations may be referred to as retrieve, modify, and destroy operations, respectively. In yet another example, the offline-compatible node may be capable of performing an algorithm (e.g., mathematical algorithm) with regard to information stored by the offline-compatible node and/or information stored by the online nodes in response to the offline-compatible node being connected to the online nodes via a network.

In a first example approach, an offline-compatible node provides offline support for a database cluster that includes a plurality of nodes and the offline-compatible node. The plurality of nodes and the offline-compatible node are configured to be interconnected via a network. The plurality of nodes are configured to be synchronized with each other to store respective instances of second information. The offline-compatible node is configured to store (e.g., initiate or maintain storage of) first information while the offline-compatible node is temporarily not connected to the plurality of nodes via the network. The offline-compatible node is further configured to connect to the plurality of nodes via the network in response to the offline-compatible node not being connected to the plurality of nodes via the network. The offline-compatible node is further configured to perform an operation with regard to the first information based at least in part on the offline-compatible node being connected to the plurality of nodes via the network.

In a second example approach, an offline-compatible node provides offline support for a database cluster that includes a plurality of nodes and the offline-compatible node. The plurality of nodes and the offline-compatible node are configured to be interconnected via a network. The plurality of nodes are configured to be synchronized with each other to store respective instances of first information. The offline-compatible node is configured to connect to the plurality of nodes via the network in response to the offline-compatible node being temporarily not connected to the plurality of nodes via the network. The offline-compatible node is further configured to receive an information portion, which is a portion of the first information of which storage by the plurality of nodes is initiated while the offline-compatible node is not connected to the plurality of nodes via the network, from a first node of the plurality of nodes based at least in part on the offline-compatible node being connected to the plurality of nodes via the network. The portion of the first information includes less than all of the first information. The offline-compatible node is further configured to initiate storage of the information portion (e.g., in a memory of the offline-compatible node) based at least in part on the offline-compatible node being connected to the plurality of nodes via the network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example offline support database system in accordance with an embodiment.

Figure 1:
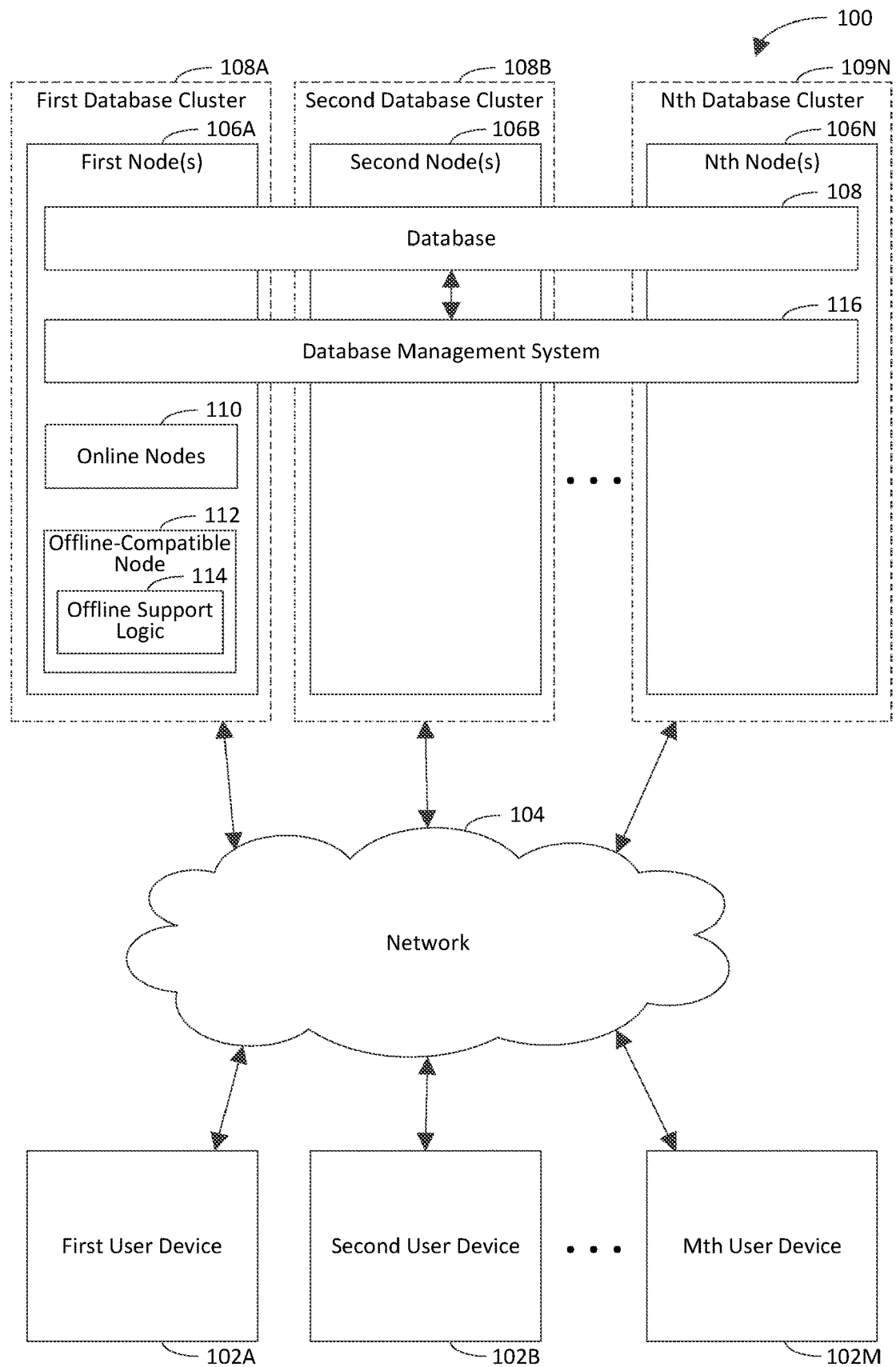

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of providing offline support for a database cluster. For instance, the database cluster may include online nodes and one or more offline-compatible nodes. Online nodes are nodes that are synchronized with each other to store respective instances of information. An offline-compatible node in a database cluster is a node that is capable of performing an operation (a.k.a. task) with regard to information, which is stored by the offline compatible node while the offline compatible node is not connected to online nodes in the database cluster via a network, in response to (e.g., based on) the offline-compatible node being (e.g., becoming) connected to the online nodes via the network. For instance, the offline-compatible node may have an unreliable connection and/or an inconsistent (e.g., periodic) connection to the online nodes via the network.

For example, the offline-compatible node may be capable of replicating information stored by the offline-compatible node to one or more of the online nodes and/or information stored by the online nodes to the offline-compatible node in response to the offline-compatible node being connected to the online nodes via a network. In an aspect of this example, information that is generated or received for storage by the offline-compatible node while the offline-compatible node is not connected to the online nodes via the network may be replicated to one or more of the online nodes based on (e.g., based at least in part on) the offline-compatible node being connected to the online nodes. In another aspect of this example, information that is generated or received for storage by any one or more of the online nodes while the offline-compatible node is not connected to the online nodes via the network may be replicated to the offline-compatible node based on the offline-compatible node being connected to the online nodes. In another example, the offline-compatible node may be capable of performing a CRUD operation on information stored by the offline-compatible node and/or causing a CRUD operation to be performed on information stored by the online nodes in response to the offline-compatible node being connected to the online nodes via a network. In yet another example, the offline-compatible node may be capable of performing an algorithm (e.g., mathematical algorithm) with regard to information stored by the offline-compatible node and/or information stored by the online nodes in response to the offline-compatible node being connected to the online nodes via a network.

Example techniques described herein have a variety of benefits as compared to conventional techniques for storing information in a database cluster. For instance, the example techniques may be capable of enabling each of one or more nodes in the database cluster to perform an operation with regard to (e.g., on) information, which is stored by the node while the node is not connected to the other nodes in the database cluster, based on the node being connected (e.g., re-connected) to the other nodes. The example techniques may be capable of enabling each of one or more nodes in the database cluster to generate or receive information for storage thereon while the node is not connected to the other nodes in the data cluster and to replicate the information to one or more of the other nodes in the database cluster based on the node being connected to the other nodes. The example techniques may be capable of enabling a node in a database cluster to replicate information, which was generated or received by other nodes in the database cluster for storage while the node was not connected to the other nodes, to the node based on the node being connected to the other nodes. The example techniques may be capable of enabling each of one or more nodes in the database cluster to perform a CRUD operation on information stored by the node or on information stored by the other nodes in the database cluster based on the node being connected to the other nodes. The example techniques may be capable of enabling each of one or more nodes in the database cluster to execute an algorithm on information stored by the node and/or information stored by the other nodes in the database cluster based on the node being connected to the other nodes.

The example techniques may enable each database cluster associated with a database to be configurable to reconcile data in accordance with a respective reconciliation technique based on a use-case of the database. For example, a first database cluster may reconcile data stored therein in accordance with a first reconciliation technique; a second database cluster may reconcile data stored therein in accordance with a second reconciliation technique, and so on. In accordance with this example, the first reconciliation technique may prioritize data stored by an offline-compatible node in a database cluster over data stored by online nodes in the database cluster, and the second reconciliation technique may prioritize data stored by online nodes in a database cluster over data stored by an offline-compatible node in the database cluster. Accordingly, an offline-compatible node in the first database cluster may replicate information, which is generated or received for storage by the offline-compatible node while the offline-compatible node is not connected to online nodes in the first database cluster, to one or more of the online nodes in accordance with the first reconciliation technique based on the offline-compatible node being connected to the online nodes. Whereas, an offline-compatible node in the second database cluster may replicate information, which is generated or received by online nodes in the second database cluster for storage, to the offline-compatible node in accordance with the second reconciliation technique based on the offline-compatible node being connected to the online nodes.

The manner in which an offline-compatible node or online nodes in a database cluster interact with a database while the offline-compatible node is not connected to the online nodes may be planned and predicted. For example, information that may be added or changed to the offline-compatible node or to the online nodes while the offline-compatible node is not connected to the online nodes may be known before such information is added or changed. In accordance with this example, the addition(s) or change(s) may be predicted based on the same or similar addition(s) or change(s) being made while the offline-compatible node was not connected to the online nodes in the past. A reconciliation technique may be selected for the database cluster based on such knowledge.

By implementing the example techniques described herein, it is not necessary for all nodes in a database cluster to include the same information. For instance, an offline-compatible node in a database cluster may include a portion (i.e., less than all) of the information that is stored by online nodes in the database cluster, which may provide faster replication and/or reconciliation of information stored by the database cluster, as compared to conventional techniques for storing information in a database cluster.

The example techniques may provide multiple entry points to the database for each database cluster. For instance, each offline-compatible node in the database cluster may serve as an entry point, and at least one of the online nodes in the database cluster may serve as an entry point. Each entry point is capable of loading and/or changing information in the database.

The example techniques may reduce an amount of time and/or resources (e.g., processor, memory, network bandwidth) that are consumed to replicate and/or reconcile data in a database cluster. For example, having an offline-compatible node in the database cluster store only a portion (or none) of the information that is stored by online nodes in the database cluster, the offline-compatible node may perform fewer operations to replicate and/or reconcile the data. By performing fewer operations, the offline-compatible node consumes fewer processing cycles, less memory, and less network bandwidth.

By reducing the amount of time and/or resources that are consumed to replicate and/or reconcile data in the database cluster, the example techniques may reduce a cost of replicating and/or reconciling the data. For instance, each portion of the data that is stored on each node of the database cluster has an associated cost. By limiting the data stored by the offline-compatible node to include only a portion (or none) of the data stored by the online nodes, the example embodiments may reduce the cost of storing data in the database cluster. The example techniques may increase efficiency of a computing system that is used to store, replicate, and/or reconcile data in the database cluster.

FIG. 1 is a block diagram of an example offline support database system 100 in accordance with an embodiment. Generally speaking, the offline support database system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the offline support database system 100 provides offline support for database cluster(s).

As shown in FIG. 1, the offline support database system 100 includes a plurality of user devices 102A-102M, a network 104, and a plurality of nodes 106A-106N. Communication among the user devices 102A-102M and the nodes 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with the nodes 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the nodes 106A-106N for requesting information stored on (or otherwise accessible via) the nodes 106A-106N. For instance, a user may initiate a request (a.k.a. access request), requesting access to information that is based on data stored in a database 108 that is hosted by any one or more of the nodes 106A-106N. A user may initiate a request for accessing such information using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the nodes 106A-106N, so that the user devices 102A-102M may access information that is available via the domains. Such domains may include Web pages, which may be provided as hypertext markup language (HTML) documents and objects (e.g., files) that are linked therein, for example.

The user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user devices 102A-102M may communicate with any one or more nodes 106A-106N.

Each of the nodes 106A-106N includes one or more servers. Each server is a processing system that is capable of communicating with the user devices 102A-102M. The nodes 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, the nodes 106A-106N are configured to host respective Web sites, so that the Web sites are accessible to users of the offline support database system 100.

One or more of the nodes 106A-106N host a database 108. The database 108 is an organized collection of information (e.g., data). The database 108 may be any suitable type of database, including but not limited to a relational database, an entity-relationship database, an object database, an object relational database, an extensible markup language (XML) database, etc.

One or more of the nodes 106A-106N host a database management system (DBMS) 116. The DBMS 116 executes database jobs against the database 108; controls access to the information in the database 108; provides functions that enable entry, storage, and retrieval of the information in the database 108; and provides ways to manage how the information is organized in the database 108. Some of the functions provided by the DBMS 116 for management of the database 108 and the information therein can be grouped as follows: (1) creation, modification, and deletion of definitions that define how the information in the database 108 is organized; (2) insertion, modification, and deletion of the information in the database 108; (3) structuring the data in a form that is directly useable by users of the user devices 102A-102M and/or by application(s); and (4) administration of the database 108. Administration of the database 108 may include, for example, registering and monitoring users of the database 108, enforcing security of the information in the database 108, monitoring performance of the database 108, recovering from a failure of a database job that is executed against the database 108, etc. The DMBS 110 may interact with users of the user devices 102A-102M, the database 108, and/or computer programs (e.g., applications) running on the user devices 102A-102M and/or the nodes 106A-106N to perform its functions.

The nodes 106A-106N may be categorized among clusters 108A-108N. For instance, in the embodiment of FIG. 1, the nodes 106A-106N are categorized such that the first node(s) 106A are included in the first database cluster 108A, the second node(s) 106B are included in the second database cluster 108B, and so on. The first node(s) 106A include a plurality of online nodes 110 and an offline-compatible node 112. The online nodes 110 are configured to be synchronized with each other to store respective instances of information. Each of the online nodes 110 may be a physical machine or a virtual machine.

The offline-compatible node 112 is capable of being disconnected from and connected (e.g., re-connected) to the online nodes 110 via the network 104. The offline-compatible node 112 includes offline support logic 114. The offline support logic 114 is configured to perform an operation with regard to information stored by the offline-compatible node 112 and/or information stored by one or more of the online nodes 110 when the offline-compatible node 112 is connected to the online nodes 110 via the network 104. For instance, the offline support logic 114 may be configured to (A) replicate information from the online nodes 110 to the offline-compatible node 112 and/or from the offline-compatible node 112 to one or more of the online nodes 110, (B) perform a CRUD operation on information stored by the offline-compatible node 112 and/or information stored by the online nodes 110, and/or (C) perform an algorithm on information stored by the offline-compatible node 112 and/or information stored by the online nodes 110 when the offline-compatible node 112 is connected to the online nodes 110 via the network 104.

In a first example implementation, the offline support logic 114 stores (e.g., initiates or maintains storage of) information in the offline-compatible node 112 (e.g., in a memory of the offline-compatible node 112) while the offline-compatible node 112 is temporarily not connected to the online nodes 110 via the network 104. The offline support logic 114 is further configured to connect the offline-compatible node 112 to the online nodes 110 via the network 104 in response to the offline-compatible node 112 not being connected to the online nodes 110 via the network 104. The offline support logic 114 is further configured to perform an operation with regard to the information based at least in part on the offline-compatible node 112 being connected to the online nodes 110 via the network 104.

In a second example implementation, the offline support logic 114 is configured to connect the offline-compatible node 112 to the online nodes 110 via the network 104 in response to the offline-compatible node 112 being temporarily not connected to the online nodes 110 via the network 104. The offline support logic 114 is further configured to receive an information portion, which the online nodes 110 initiated storing while the offline-compatible node 112 was not connected to the online nodes 110 via the network 104, from a first node that is included among the online nodes 110 based at least in part on the offline-compatible node 112 being connected to the online nodes 110 via the network 104. The information portion includes less than all of the information stored by the online nodes 110. The offline support logic 114 is further configured to initiate storage of the information portion in the offline-compatible node 112 based at least in part on the offline-compatible node 112 being connected to the online nodes 110 via the network 104.

The offline support logic 114 may be implemented in various ways to provide offline support for a database cluster, including being implemented in hardware, software, firmware, or any combination thereof. For example, the offline support logic 114 may be implemented as computer program code configured to be executed in one or more processors. In another example, the offline support logic 114 may be implemented as hardware logic/electrical circuitry. For instance, the offline support logic 114 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The online nodes 110 and the offline-compatible node 112 are shown to be included in the first database cluster 108A for non-limiting, illustrative purposes. It will be recognized that any one or more of the clusters 108A-108N may include online nodes and offline-compatible node(s). The first database cluster 108A is shown to include a single offline-compatible node 112 for non-limiting, illustrative purposes. It will be recognized that each cluster may include any suitable number of offline-compatible nodes (e.g., 0, 1, 2, 3, and so on).

Figure 2:
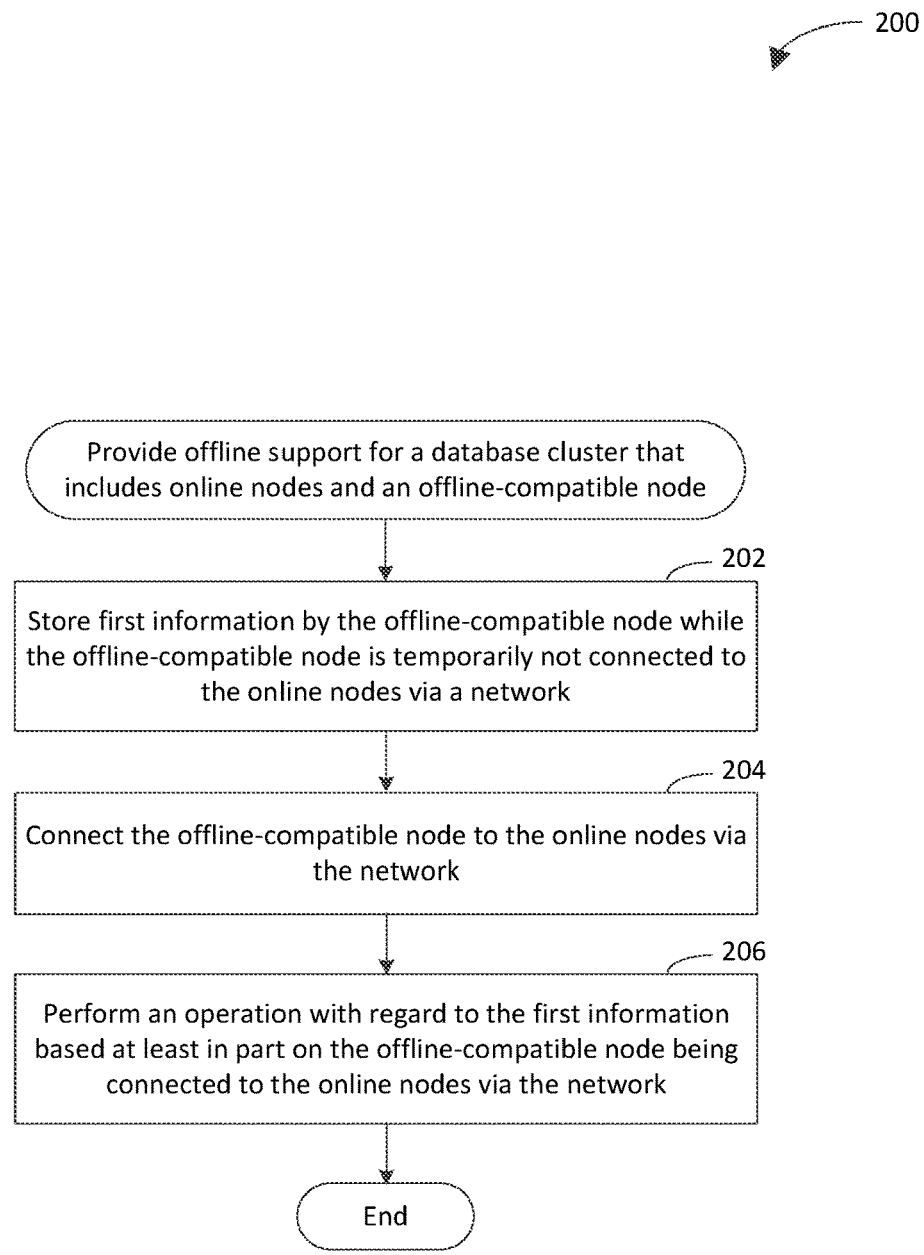
FIGS. 2 and 4 depict flowcharts of example methods for providing offline support for a database cluster in accordance with embodiments.
Figure 3:
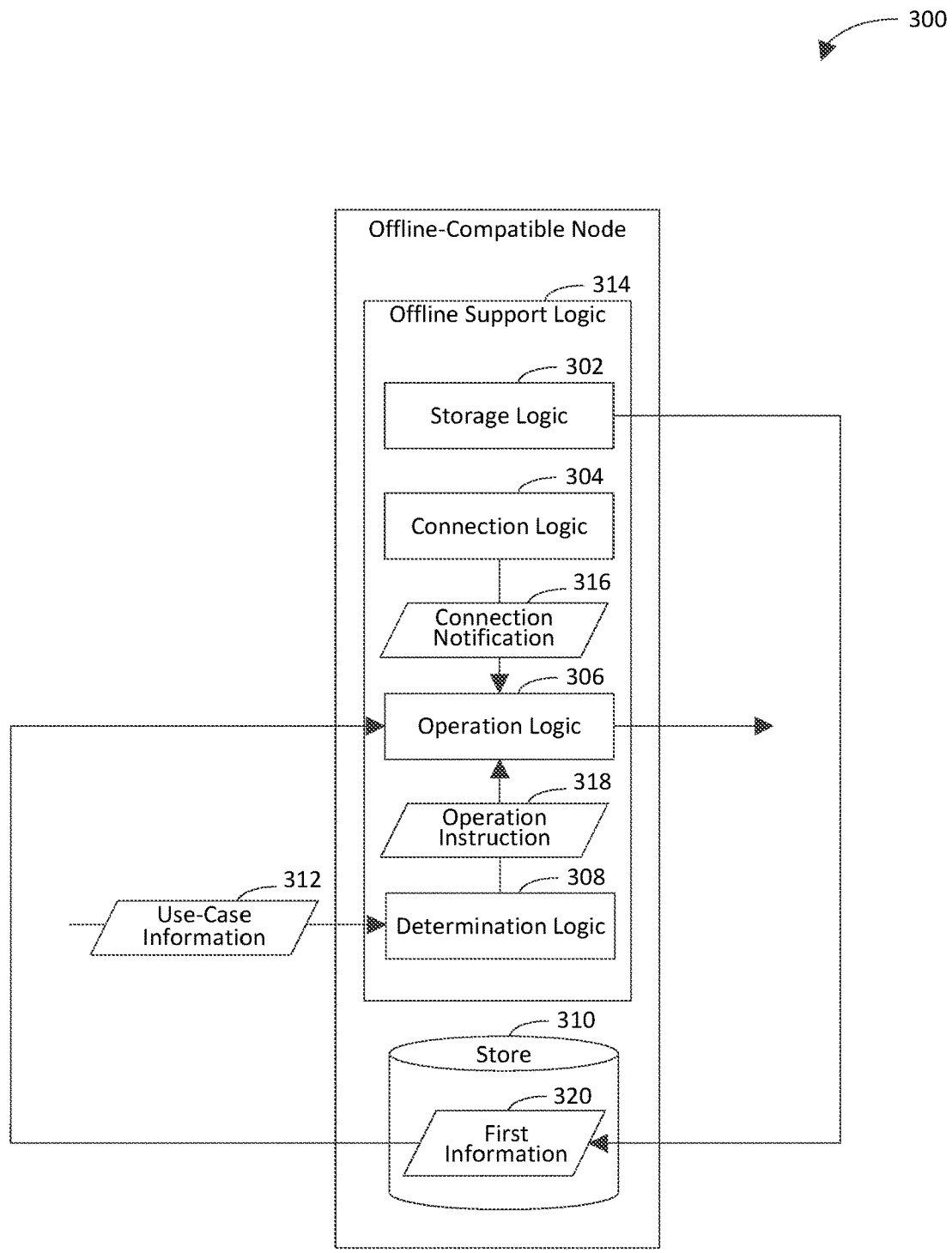
FIGS. 3 and 5 are block diagrams of example implementations of an offline-compatible node shown in FIG. 1 in accordance with embodiments.

FIG. 2 depicts a flowchart 200 of an example method for providing offline support for a database cluster that includes online nodes and an offline-compatible node that are configured to be interconnected via a network in accordance with an embodiment. Flowchart 200 may be performed by the offline-compatible node 112 shown in FIG. 1, for example. For illustrative purposes, flowchart 200 is described with respect to an offline-compatible node 300 shown in FIG. 3. The offline-compatible node 300 includes offline support logic 314 and a store 310. The offline support logic 314 includes storage logic 302, connection logic 304, operation logic 306, and determination logic 308. The store 310 can be any suitable type of store. For instance, the store 310 may be a database. Further structural and operational embodiments will be apparent to persons skilled in the relevant art(s) based on the discussion regarding flowchart 200.

As shown in FIG. 2, the method of flowchart 200 begins at step 202. In step 202, first information is stored by the offline-compatible node while the offline-compatible node is temporarily not connected to the online nodes, which are configured to be synchronized with each other to store respective instances of second information, via the network. In an example implementation, the storage logic 302 stores first information 320 in the store 310 while the offline-compatible node 300 is temporarily not connected to the online nodes via the network.

At step 204, the offline-compatible node is connected to the online nodes via the network in response to the offline-compatible node not being connected to the online nodes via the network. In an example implementation, the connection logic 304 connects the offline-compatible node 300 to the online nodes via the network in response to the offline-compatible node 300 not being connected to the online nodes via the network. In accordance with this implementation, the connection logic 304 may generate a connection notification 316 to indicate (e.g., specify) that the offline-compatible node 300 is connected to the online nodes via the network.

At step 206, an operation is performed with regard to the first information based at least in part on the offline-compatible node being connected (e.g., re-connected) to the online nodes via the network. The first information may include one or more specified columns of the database, one or more specified rows of the database, and/or one or more tables of the database. In an example implementation, the operation logic 306 performs the operation with regard to the first information 320 based at least in part on the offline-compatible node 300 being connected to the online nodes via the network. For instance, the operation logic 306 may perform the operation with regard to the first information 320 in response to receipt of the connection notification 316 (e.g., based at least in part on the connection notification 316 indicating that the offline-compatible node 300 is connected to the online nodes via the network).

In an example embodiment, a database schema of a database with which the database cluster is associated defines the offline-compatible node to be capable of performing the operation with regard to the first information as a result of the offline-compatible node being connected to the online nodes via the network. In accordance with this embodiment, performing the operation at step 206 includes performing the operation with regard to the first information based at least in part on the database schema of the database defining the offline-compatible node to be capable of performing the operation with regard to the first information as a result of the offline-compatible node being connected to the online nodes via the network.

In another example embodiment, instructions that are executed against a database with which the database cluster is associated define the offline-compatible node to be capable of performing the operation with regard to the first information as a result of the offline-compatible node being connected to the online nodes via the network. In accordance with this embodiment, performing the operation at step 206 includes performing the operation with regard to the first information based at least in part on the instructions that are executed against the database defining the offline-compatible node to be capable of performing the operation with regard to the first information as a result of the offline-compatible node being connected to the online nodes via the network. In an aspect of this embodiment, a database schema of the database may specify that the operation is not to be performed with regard to the first information in response to the offline-compatible node being connected to the online nodes via the network. In accordance with this aspect, the instructions that are executed against the database may have a priority that is greater than a priority of the database schema.

In yet another example embodiment, a specified node is chosen from a corpus of nodes of the database cluster to be the offline-compatible node based at least in part on a use-case of the database cluster. A use-case of the database cluster indicates a type of scenario in which the database is used. One example of a use-case is an airline scenario. In an airline scenario, the offline-compatible node may be located on an airplane, and the online nodes may be located on land (e.g., at or near the airport). Another example of a use-case is a drone scenario. In the drone scenario, the offline-compatible node may be located on a drone, and the online nodes may be located on land. Yet another example of a use-case is a boat scenario. In a boat scenario, the offline-compatible node may be located on a boat, and each of the online nodes may be located on land or on another boat. Still another example of a use-case is a space scenario. In the space scenario, the offline-compatible node may be located on a space craft, and each of the online nodes may be located on Earth or on an object (e.g., space station) in outer space.

In an example embodiment, performing the operation at step 206 includes performing a CRUD operation on the first information stored by the offline-compatible node based at least in part on the offline-compatible node being connected to the online nodes via the network. For example, the CRUD operation may include creating, reading, updating, and/or deleting one or more entries, one or more rows, one or more columns, and/or one or more tables of the first information. In another example, the CRUD operation may include deleting an entirety of the first information from the offline-compatible node.

In another example embodiment, performing the operation at step 206 includes causing a CRUD operation to be performed on the second information stored by the online nodes based at least in part on the offline-compatible node being connected to the online nodes via the network. For example, a create operation may be performed to create the first information (or a portion thereof) on one or more of the online nodes. For instance, the create operation may be performed to store the first information in addition to the second information on the one or more online nodes. In another example, an update operation may be performed to modify one or more instances of the second information that are stored by one or more respective online nodes to include the first information. For instance, the update operation may be performed to incorporate the first information into the one or more instances of the second information.

In yet another example embodiment, performing the operation at step 206 includes performing an algorithm (e.g., a mathematical algorithm) on at least the first information to generate derived information. For instance, performing the algorithm may include analyzing and manipulating the first information. In accordance with this embodiment, performing the operation at step 206 further includes causing the derived information to be stored by the offline-compatible node and/or one or more of the online nodes based at least in part on the offline-compatible node being connected to the online nodes via the network. For instance, performing the operation at step 206 may include causing the derived information to be incorporated into the second information stored by the online nodes. In an aspect of this embodiment, performing the operation at step 206 may include performing the algorithm on at least the first information and at least a portion of the second information that is stored by the online nodes to generate the derived information. For instance, performing the algorithm may include adding a first number in the first information to a second number in the second information to generate the derived information to include a third number that is a sum of the first number and the second number.

In still another example embodiment (referred to herein as "the replication embodiment"), performing the operation at step 206 includes replicating the first information to one or more of the online nodes by causing the one or more online nodes to store one or more respective instances of the first information based at least in part on the offline-compatible node being connected to the online nodes via the network. Further detail regarding the replication embodiment is provided in the following discussion.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes determining whether the operation is to be performed with regard to the first information based at least in part on a use-case of the database cluster. In accordance this this embodiment, a first use-case of the database cluster indicates that the operation is to be performed with regard to the first information, and a second use-case of the database cluster indicates that the operation is not to be performed with regard to the first information. For example, the determination logic 308 may determine whether the operation is to be performed with regard to the first information 320 based at least in part on use-case information 312 (e.g., based at least in part on the use-case indicated by the use-case information 312). In accordance with this example, the determination logic 308 may generate an operation instruction 318 based on the use-case indicated by the use-case information 312. In further accordance with this example, the determination logic 308 is configured to generate the operation instruction 318 to indicate that the operation is to be performed with regard to the first information 320 based on the use-case information 312 indicating the first use-case. The determination logic 308 is further configured to not generate the operation instruction 318 or to generate the operation instruction 318 to indicate that the operation is not to be performed with regard to the first information 320 based on the use-case information 312 indicating the second use-case.

In accordance with this embodiment, the operation is performed at step 206 based at least in part on the use-case of the database cluster being the first use-case (e.g., rather than the second use-case). For instance, the operation logic 306 may perform the operation with regard to the first information 320 based on the operation instruction 318 indicating that the operation is to be performed with regard to the first information 320.

As mentioned above, in the replication embodiment, performing the operation with regard to the first information at step 206 includes replicating the first information to one or more of the online nodes by causing (e.g., triggering) the one or more online nodes to store one or more respective instances of the first information based at least in part on the offline-compatible node being connected (e.g., reconnected) to the online nodes via the network. For example, the first information may be replicated to one or more of the online nodes based on a priority of the offline-compatible node being greater than a priority of the online nodes. In accordance with this example, the priorities of the offline-compatible node and the online nodes may be established by a schema of a database with which the database cluster is associated or by instructions (e.g., user-generated instructions) that are executed against the database. The first information may be replicated to all of the online nodes or fewer than all of the online nodes.

In an example implementation, the operation logic 306 replicates the first information 320 to one or more of the online nodes by causing the one or more online nodes to store one or more respective instances of the first information based at least in part on the offline-compatible node 300 being connected to the online nodes via the network. For instance, the operation logic 306 may replicate the first information 320 to the one or more online nodes in response to receipt of the connection notification 316 (e.g., based at least in part on the connection notification 316 indicating that the offline-compatible node 300 is connected to the online nodes via the network). The operation logic 306 may retrieve the first information 320 from the store 310. The operation logic 306 may cause the one or more online nodes to store the one or more respective instances of the first information in any of a variety of ways. For example, the operation logic 306 may provide the first information 320 to a DBMS, which then forwards the first information 320 to the one or more online nodes. In another example, the operation logic 306 may provide the first information 320 directly to the one or more online nodes (e.g., without passing the first information 320 through the DBMS). In yet another example, the operation logic 306 may provide an explicit instruction to the one or more online nodes that instructs the one or more online nodes to store the first information 320. In still another example, providing the first information 320 (directly or indirectly) to the one or more online nodes may serve as an implicit instruction for the one or more online nodes to store the first information 320.

In an aspect of the replication embodiment, replicating the first information to the one or more online nodes at step 206 may include not causing each of the online nodes that is not included among the one or more online nodes to store a respective instance of the first information in response to the offline-compatible node being connected to the online nodes via the network.

In another aspect of the replication embodiment, replicating the first information to the one or more online nodes at step 206 may include causing the one or more online nodes to store the one or more respective instances of the first information in addition to the one or more respective instances of the second information based at least in part on the offline-compatible node being connected to the online nodes via the network. In accordance with this aspect, replicating the first information to the one or more online nodes at step 206 may further include not causing each of the online nodes that is not included in the one or more online nodes to store an instance of the first information in addition to the respective instance of the second information.

In yet another aspect of the replication embodiment, a specified node may be chosen from a corpus (e.g., collection or group) of nodes of the database cluster to be the offline-compatible node based at least in part on a use-case of the database cluster. In an airline use-case, the offline-compatible node may be located on an airplane, and the online nodes may be located on land (e.g., at or near the airport). In accordance with this use-case, the first information may include a flight recording (e.g., from a black box on the airplane) and information regarding food and drink inventory on the airplane, passengers on the airplane (e.g., mobility assistance requests, seat locations, identify of persons involved in disturbances or potential crimes), an amount of fuel remaining on the airplane, and other analytics regarding the flight or the airplane. For instance, pilot(s) and/or flight attendant(s) on the flight may generate and/or update at least some of (e.g., all) the first information while the offline-compatible node is not connected to the online nodes via the network (e.g., during the flight). In a drone use-case, the offline-compatible node may be located on a drone, and the online nodes may be located on land. In accordance with this use-case, the first information may include video images that are captured by camera(s) on the drone, a flight path of the drone, an amount of battery charge remaining for the drone, and other analytics regarding the flight or the drone.

In still another aspect of the replication embodiment, a database schema of a database with which the database cluster is associated and/or instructions (e.g., user-generated instructions) that are executed against the database may indicate that information stored by the offline-compatible node has priority over information stored by the online nodes (i.e., the information stored by the offline-compatible node has a priority that is greater than a priority of the information stored by the online nodes). In accordance with this embodiment, replicating the first information to the one or more online nodes may include causing the one or more online nodes to store the one or more respective instances of the first information based at least in part on the database schema and/or the instructions indicating that the information stored by the offline-compatible node has priority over the information stored by the online nodes.

In an aspect of the replication embodiment, the method of flowchart 200 may further include changing an information portion that is stored by the offline-compatible node while the offline-compatible node is temporarily not connected to the plurality of nodes via the network to provide the first information. The information portion is a portion of the second information stored by the online nodes. For example, the storage logic 302 may change the information portion that is stored by the offline-compatible node 300 while the offline-compatible node 300 is temporarily not connected to the online nodes via the network to provide the first information 320. In accordance with this aspect, replicating the first information to the one or more online nodes at step 206 may include causing the one or more online nodes to replace one or more respective instances of the portion in the one or more respective instances of the second information that are stored by the one or more respective online nodes with the one or more respective instances of the first information based at least in part on the offline-compatible node being connected to the online nodes via the network. In further accordance with this aspect, replicating the first information to the one or more online nodes at step 206 may further include not causing each of the online nodes that is not included in the one or more online nodes to store an instance of the first information in addition to the respective instance of the second information.

In an example of this aspect, a database schema of a database with which the database cluster is associated defines the offline-compatible node to be capable of changing the information portion that is stored by the offline-compatible node while the offline-compatible node is temporarily not connected to the online nodes via the network to provide the first information. The database schema may further define the offline-compatible node to provide the changed information to the one or more online nodes in response to the offline-compatible node being connected to the online nodes via the network. In accordance with this example, the database schema specifies that the one or more instances of the portion in the one or more respective instances of the second information that are stored by the one or more respective online nodes are to be replaced with the one or more respective instances of the first information in response to the offline-compatible node being connected to the online nodes via the network. For instance, the database schema may define the one or more online nodes to replace the one or more instances of the portion in the one or more respective instances of the second information that are stored by the one or more respective online nodes with the one or more respective instances of the first information in response to the offline-compatible node being connected to the online nodes via the network. In further accordance with this example, causing the one or more online nodes to replace the one or more respective instances of the portion in the one or more respective instances of the second information that are stored by the one or more respective online nodes may be performed based at least in part on the database schema specifying that the one or more instances of the portion in the one or more respective instances of the second information that are stored by the one or more respective online nodes are to be replaced with the one or more respective instances of the first information in response to the offline-compatible node being connected to the online nodes via the network.

In another example of this aspect, changing the information portion that is stored by the offline-compatible node while the offline-compatible node is temporarily not connected to the online nodes via the network is performed based at least in part on instructions that are executed against a database with which the database cluster is associated defining the offline-compatible node to be capable of changing the information portion that is stored by the offline-compatible node while the offline-compatible node is temporarily not connected to the online nodes via the network. In accordance with this example, causing the one or more online nodes to replace the one or more respective instances of the portion in the one or more respective instances of the second information that are stored by the one or more respective online nodes with the one or more respective instances of the first information is performed based at least in part on the instructions specifying that the one or more instances of the portion in the one or more respective instances of the second information that are stored by the one or more respective online nodes are to be replaced with the one or more respective instances of the first information in response to the offline-compatible node being connected to the online nodes via the network. In an implementation, a database schema of the database may specify that the one or more instances of the portion in the one or more respective instances of the second information that are stored by the one or more respective online nodes are not to be replaced with the one or more respective instances of the first information in response to the offline-compatible node being connected to the online nodes via the network. In accordance with this implementation, causing the one or more online nodes to replace the one or more respective instances of the portion in the one or more respective instances of the second information that are stored by the one or more respective online nodes with the one or more respective instances of the first information may be performed further based at least in part on the instructions that are executed against the database having a priority that is greater than a priority of the database schema.

In yet another example of this aspect, the first information stored by the offline-compatible node has a first priority, and the portion of the second information stored by the online nodes has a second priority. In accordance with this example, causing the one or more online nodes to replace the one or more respective instances of the portion in the one or more respective instances of the second information that are stored by the one or more respective online nodes with the one or more respective instances of the first information is performed further based at least in part on the first priority being greater than the second priority.

In still another example of this aspect, the first information stored by the offline-compatible node has a first timestamp indicating a first time at which the first information is stored by the offline-compatible node, and the portion of the second information stored by the online nodes has a second timestamp indicating a second time at which the second information is stored by the online nodes. In accordance with this example, causing the one or more online nodes to replace the one or more respective instances of the portion in the one or more respective instances of the second information that are stored by the one or more respective online nodes with the one or more respective instances of the first information is performed further based at least in part on the second time indicated by the second timestamp temporally preceding the first time indicated by the first timestamp.

In another example of this aspect, a determination is made that the first information stored by the offline-compatible node is changed by a first extent with reference to reference information. For instance, the reference information may be the information portion. For instance, the determination logic 308 may determine that the first information 320 is changed by the first extent. In accordance with this example, a determination is made that the portion of the second information stored by the online nodes is changed by a second extent with reference to the reference information. For instance, the determination logic 308 may determine that the second information is changed by the second extent. In further accordance with this example, causing the one or more online nodes to replace the one or more respective instances of the portion in the one or more respective instances of the second information that are stored by the one or more respective online nodes with the one or more respective instances of the first information is performed further based at least in part on the first extent being greater than the second extent.

In yet another example of this aspect, an inquiry is provided to a user of the database cluster. The inquiry requests that the user choose between (1) replacing the one or more instances of the portion in the one or more respective instances of the second information that are stored by the one or more respective online nodes with the one or more respective instances of the first information and (2) not replacing the one or more instances of the portion in the one or more respective instances of the second information that are stored by the one or more respective online nodes with the one or more respective instances of the first information. For instance, the determination logic 308 may provide the inquiry to the user. In accordance with this example, causing the one or more online nodes to replace the one or more respective instances of the portion in the one or more respective instances of the second information that are stored by the one or more respective online nodes with the one or more respective instances of the first information is performed further based at least in part on receipt of a response to the inquiry from the user, indicating that the user chooses to replace the one or more instances of the portion in the one or more respective instances of the second information that are stored by the one or more respective online nodes with the one or more respective instances of the first information. In an example implementation, the determination logic 308 receives the response to the inquiry. In accordance with this implementation, the determination logic 308 generates the operation instruction 318 to indicate that the one or more instances of the portion in the one or more respective instances of the second information that are stored by the one or more respective online nodes are to be replaced with the one or more respective instances of the first information based at least in part on the response to the inquiry. In further accordance with this implementation, the operation logic 306 causes the one or more online nodes to replace the one or more respective instances of the portion in the one or more respective instances of the second information that are stored by the one or more respective online nodes with the one or more respective instances of the first information based at least in part on the operation instruction 318 indicating that the one or more instances of the portion in the one or more respective instances of the second information that are stored by the one or more respective online nodes are to be replaced with the one or more respective instances of the first information.

In another aspect of the replication embodiment, the method of flowchart 200 may further include deleting the first information from the offline-compatible node based at least in part on knowledge that the offline-compatible node is to become disconnected from the online nodes via the network in response to causing the one or more online nodes to store the one or more respective instances of the first information. For instance, the first information may be deleted from the offline-compatible node in anticipation of an event. The event may be known to cause the offline-compatible node to become disconnected from the online nodes via the network or have a likelihood of causing the offline-compatible node of becoming disconnected from the online nodes via the network that is greater than or equal to a likelihood threshold. The event may be a next airline flight, drone flight, boat departure, or space craft departure. In an example implementation, the storage logic 302 deletes the first information 320 from the store 310 based at least in part on knowledge that the offline-compatible node 300 is to become disconnected from the online nodes via the network in response to causing the one or more online nodes to store the one or more respective instances of the first information 320. In accordance with this aspect, the method of flowchart 200 may include not deleting the first information from the online nodes as a result (e.g., consequence) of the knowledge that the offline-compatible node is to become disconnected from the online nodes via the network. In an example implementation, the storage logic 302 does not delete the first information 320 from the online nodes as a result of the aforementioned knowledge.

In yet another aspect of the replication embodiment, the method of flowchart 200 may further include determining whether the first information stored by the offline-compatible node is to be replicated to the one or more online nodes based at least in part on a use-case of the database cluster. In accordance this this aspect, a first use-case of the database cluster may indicate that the first information stored by the offline-compatible node is to be replicated to the one or more online nodes, and a second use-case of the database cluster may indicate that the first information stored by the offline-compatible node is not to be replicated to the one or more online nodes. For example, the determination logic 308 may determine whether the first information 320 stored in the store 310 is to be replicated to the one or more online nodes based at least in part on use-case information 312 (e.g., based at least in part on the use-case indicated by the use-case information 312). In accordance with this example, the determination logic 308 may generate an operation instruction 318 based on the use-case indicated by the use-case information 312. In further accordance with this example, the determination logic 308 is configured to generate the operation instruction 318 to indicate that the first information is to be replicated to the one or more online nodes based on the use-case information 312 indicating the first use-case. The determination logic 308 is further configured to not generate the operation instruction 318 or to generate the operation instruction 318 to indicate that the first information is not to be replicated to the one or more online nodes based on the use-case information 312 indicating the second use-case. In accordance with this aspect, replicating the first information to the one or more online nodes at step 206 may include causing the one or more online nodes to store the one or more respective instances of the first information based at least in part on the use-case of the database cluster being the first use-case (e.g., rather than the second use-case). For instance, the operation logic 306 may cause the one or more online nodes to store the one or more respective instances of the first information based on the operation instruction 318 indicating that the first information is to be replicated to the one or more online nodes.

It will be recognized that the offline-compatible node 300 may not include one or more of the storage logic 302, the connection logic 304, the operation logic 306, the determination logic 308, the store 310, and/or the offline support logic 314. Furthermore, the offline-compatible node 300 may include components in addition to or in lieu of the storage logic 302, the connection logic 304, the operation logic 306, the determination logic 308, the store 310, and/or the offline support logic 314.

Figure 4:
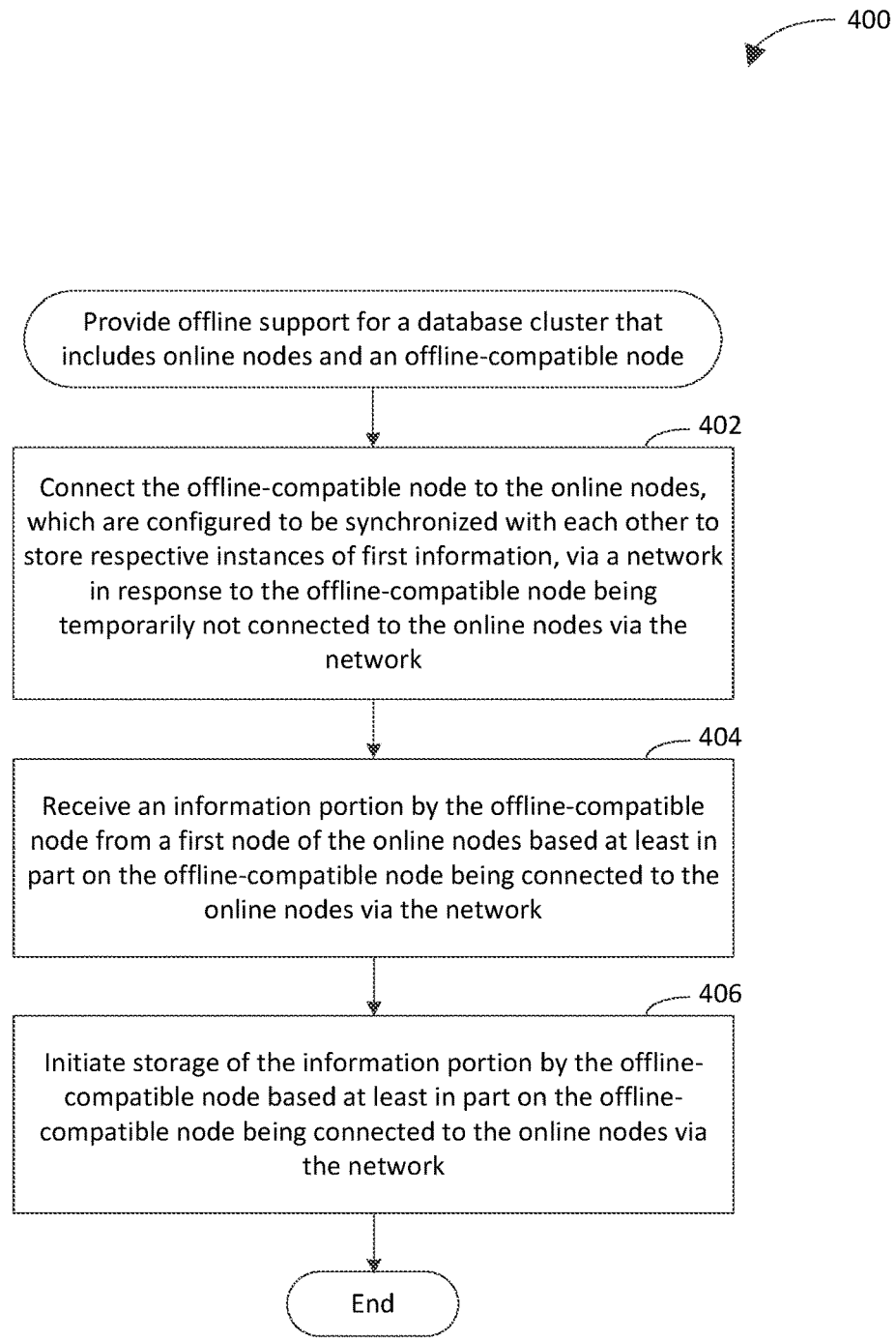
Figure 5:
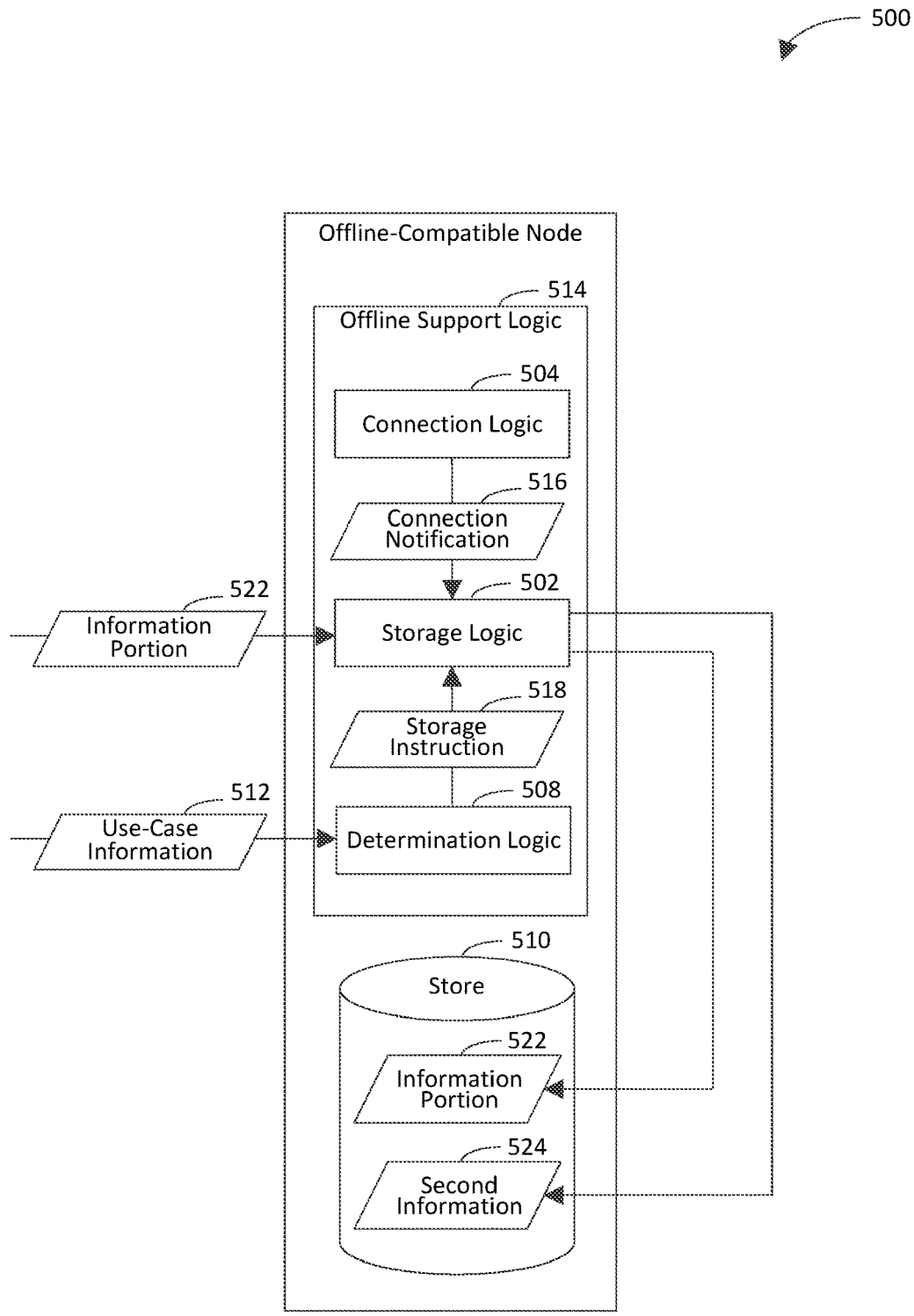

FIG. 4 depicts a flowchart 400 of another example method for providing offline support for a database cluster that includes online nodes and an offline-compatible node that are configured to be interconnected via a network in accordance with an embodiment. Flowchart 400 may be performed by the offline-compatible node 112 shown in FIG. 1, for example. For illustrative purposes, flowchart 400 is described with respect to an offline-compatible node 500 shown in FIG. 5. The offline-compatible node 500 includes offline support logic 514 and a store 510. The offline support logic 514 includes storage logic 502, connection logic 504, and determination logic 508. The store 510 can be any suitable type of store. For instance, the store 510 may be a database. Further structural and operational embodiments will be apparent to persons skilled in the relevant art(s) based on the discussion regarding flowchart 400.

As shown in FIG. 4, the method of flowchart 400 begins at step 402. In step 402, the offline-compatible node is connected to the online nodes, which are configured to be synchronized with each other to store respective instances of first information, via a network in response to the offline-compatible node being temporarily not connected to the online nodes via the network. In an example implementation, the connection logic 504 connects the offline-compatible node 500 to the online nodes via the network in response to the offline-compatible node 500 being temporarily not connected to the online nodes via the network. In accordance with this implementation, the connection logic 504 may generate a connection notification 516 to indicate (e.g., specify) that the offline-compatible node 500 is connected to the online nodes via the network.

At step 404, an information portion is received by the offline-compatible node from a first node of the online nodes based at least in part on the offline-compatible node being (e.g., becoming) connected to the online nodes via the network. The information portion is a portion of the first information of which storage by the online nodes is initiated while the offline-compatible node is not connected to the online nodes via the network (e.g., as a result of losing a connection to the online nodes via the network). The portion of the first information includes less than all of the first information. In an example implementation, the storage logic 502 receives an information portion 522 from the first node of the online nodes based at least in part on the offline-compatible node 500 being connected to the online nodes via the network. In accordance with this implementation, the information portion 522 is a portion of the first information of which storage by the online nodes is initiated while the offline-compatible node 500 is not connected to the online nodes via the network.

At step 406, storage of the information portion is initiated (e.g., triggered) by the offline-compatible node based at least in part on the offline-compatible node being connected (e.g., reconnected) to the online nodes via the network. For example, storage of the information portion may be initiated based on a priority of the online nodes being greater than a priority of the offline-compatible node. In accordance with this example, the priorities of the offline-compatible node and the online nodes may be established by a schema of a database with which the database cluster is associated or by instructions (e.g., user-generated instructions) that are executed against the database. It may be said that initiating the storage of the information portion includes replicating the information portion to the offline-compatible node. The information portion may include one or more specified columns of the database, one or more specified rows of the database, and/or one or more tables of the database. In an example implementation, the storage logic 502 initiates storage of the information portion 522 based at least in part on the offline-compatible node 500 being connected to the online nodes via the network. For instance, the storage logic 502 may initiate the storage of the information portion 522 in response to receipt of the connection notification 516 (e.g., based at least in part on the connection notification 516 indicating that the offline-compatible node 500 is connected to the online nodes via the network).

In an example embodiment, a specified node is chosen from a corpus of nodes of the database cluster to be the offline-compatible node based at least in part on a use-case of the database cluster.

In some example embodiments, one or more steps 402, 404, and/or 406 of flowchart 400 may not be performed. Moreover, steps in addition to or in lieu of steps 402, 404, and/or 406 may be performed. For instance, in an example embodiment, the method of flowchart 400 further includes storing second information by the offline-compatible node while the offline-compatible node is temporarily not connected to the online nodes via the network. For example, the storage logic 502 may store second information 524 in the store 510 while the offline-compatible node 500 is temporarily not connected to the online nodes via the network.

In an aspect of this embodiment, initiating the storage of the information portion by the offline-compatible node may include storing the information portion in addition to the second information by the offline-compatible node based at least in part on the offline-compatible node being connected to the online nodes via the network. For instance, the storage logic 502 may store the information portion 522 in addition to the second information 524 in the store 510 based at least in part on the offline-compatible node 500 being connected to the online nodes via the network.

In another aspect of this embodiment, initiating the storage of the information portion by the offline-compatible node may include replacing the second information that is stored by the offline-compatible node with the information portion based at least in part on the offline-compatible node being connected to the online nodes via the network. For instance, the storage logic 502 may replace the second information 524 that is stored in the store 510 with the information portion 522 based at least in part on the offline-compatible node 500 being connected to the online nodes via the network.

In an example of this aspect, a database schema of a database with which the database cluster is associated may define the offline-compatible node to be capable of being temporarily not connected to the online nodes via the network and to be further capable of being connected to the online nodes in response to the offline-compatible node being temporarily not connected to the online nodes via the network. In accordance with this example, the database schema may specify that the second information that is stored by the offline-compatible node is to be replaced with the information portion in response to the offline-compatible node being connected to the online nodes via the network. For instance, the database schema may define the offline-compatible node to replace the second information that is stored by the offline-compatible node with the information portion in response to the offline-compatible node being connected to the online nodes via the network. The database schema may further define the first node to provide the information portion to the offline-compatible node in response to the offline-compatible node being connected to the online nodes via the network. In further accordance with this example, replacing the second information that is stored by the offline-compatible node with the information portion may be based at least in part on the database schema specifying that the second information that is stored by the offline-compatible node is to be replaced with the information portion in response to the offline-compatible node being connected to the online nodes via the network.

In another example of this aspect, replacing the second information that is stored by the offline-compatible node with the information portion is performed based at least in part on (1) instructions that are executed against a database with which the database cluster is associated defining the offline-compatible node to be capable of being temporarily not connected to the online nodes via the network and to be further capable of being connected to the online nodes in response to the offline-compatible node being temporarily not connected to the online nodes via the network and (2) the instructions specifying that the second information that is stored by the offline-compatible node is to be replaced with the information portion in response to the offline-compatible node being connected to the online nodes via the network. In accordance with this example, a database schema of the database may specify that the second information that is stored by the offline-compatible node is not to be replaced with the information portion. In further accordance with this example, replacing the second information that is stored by the offline-compatible node with the information portion may be performed based at least in part on the instructions that are executed against the database having a priority that is greater than a priority of the database schema.

In yet another example of this aspect, a database schema of a database with which the database cluster is associated and/or instructions that are executed against the database indicate that information stored by the online nodes has priority over information stored by the offline-compatible node. In accordance with this example, replacing the second information that is stored by the offline-compatible node with the information portion may be performed based at least in part on the database schema and/or the instructions indicating that the information stored by the online nodes has priority over the information stored by the offline-compatible node.

In an implementation of this example, the information portion that is received by the offline-compatible node from the first node has a first priority, and the second information that is stored by the offline-compatible node has a second priority. In accordance with this implementation, replacing the second information that is stored by the offline-compatible node with the information portion is performed further based at least in part on the first priority being greater than the second priority.

In another implementation of this example, the information portion that is received by the offline-compatible node from the first node has a first timestamp indicating a first time at which the information portion is stored by the first node, and the second information that is stored by the offline-compatible node has a second timestamp indicating a second time at which the second information is stored by the offline-compatible node. In accordance with this implementation, replacing the second information that is stored by the offline-compatible node with the information portion is performed further based at least in part on the second time indicated by the second timestamp temporally preceding the first time indicated by the first timestamp.

In yet another implementation of this example, a determination is made that the information portion that is received by the offline-compatible node from the first node is changed by a first extent with reference to reference information. For example, the determination logic 508 may determine that the information portion 522 is changed by the first extent. In accordance with this implementation, a determination is made that the second information that is stored by the offline-compatible node is changed by a second extent with reference to the reference information. For example, the determination logic 508 may determine that the second information 524 is changed by the second extent. In further accordance with this implementation, replacing the second information that is stored by the offline-compatible node with the information portion is performed further based at least in part on the first extent being greater than the second extent.

In still another implementation of this example, an inquiry is provided to a user of the database cluster. The inquiry requests that the user choose between (1) replacing the second information that is stored by the offline-compatible node with the information portion and (2) not replacing the second information that is stored by the offline-compatible node with the information portion. For instance, the determination logic 508 may provide the inquiry to the user. In accordance with this implementation, replacing the second information that is stored by the offline-compatible node with the information portion is performed further based at least in part on receipt of a response to the inquiry from the user, indicating that the user chooses to replace the second information that is stored by the offline-compatible node with the information portion. For example, the determination logic 508 may receive the response to the inquiry. In accordance with this example, the determination logic 508 may generate the storage instruction 518 to indicate that the second information 524 that is stored in the store 510 of the offline-compatible node 500 is to be replaced with the information portion 522. In further accordance with this example, the storage logic 502 may replace the second information 524 that is stored in the store 510 of the offline-compatible node 500 with the information portion 522 based at least in part on the storage instruction 518 indicating that the second information 524 that is stored in the store 510 of the offline-compatible node 500 is to be replaced with the information portion 522.

In still another example of this aspect, the method of flowchart 400 further includes determining whether the information portion is to be replicated from the online nodes to the offline-compatible node based at least in part on a use-case of the database cluster. In accordance with this example, a first use-case of the database cluster indicates that the information portion is to be replicated from the online nodes to the offline-compatible node, and a second use-case of the database cluster indicates that the information portion is not to be replicated from the online nodes to the offline-compatible node. In an example implementation, the determination logic 508 may determine whether the information portion 522 is to be replicated from the online nodes to the offline-compatible node 500 based at least in part on use-case information 512 (e.g., based at least in part on the use-case indicated by the use-case information 512). In accordance with this implementation, the determination logic 508 may generate a storage instruction 518 based on the use-case indicated by the use-case information 512. In further accordance with this example, the determination logic 508 is configured to generate the storage instruction 518 to indicate that the information portion 522 is to be replicated from the online nodes to the offline-compatible node 500 based on the use-case information 512 indicating the first use-case. The determination logic 508 is further configured to not generate the storage instruction 518 or to generate the storage instruction 518 to indicate that the information portion 522 is not to be replicated from the online nodes to the offline-compatible node 500 based on the use-case information 512 indicating the second use-case. In accordance with this example, initiating the storage of the information portion by the offline-compatible node is performed based at least in part on the use-case of the database cluster being the first use-case (e.g., rather than the second use-case). For instance, the storage logic 502 may initiate the storage of the information portion 522 in the store 510 based on the storage instruction 518 indicating that the information portion 522 is to be replicated from the online nodes to the offline-compatible node 500.

The embodiments described herein are applicable to any suitable use-case. For instance, in an airline use-case, the offline-compatible node may be located on an airplane, and the online nodes may be located on land (e.g., at or near the airport). In accordance with this use-case, the information portion may include a flight plan (e.g., flight schedule) for an upcoming flight, a scheduled duration of the upcoming flight, an inventory of food and drinks that are to be loaded onto the airplane, a list of passengers and seat assignments on the airplane, a list of passengers who have requested mobility (e.g., wheelchair) assistance, security information regarding one or more of the passengers, and an amount of fuel that has been (or is to be) loaded onto the airplane. In a drone use-case, the offline-compatible node may be located on a drone, and the online nodes may be located on land. In accordance with this use-case, the information portion may include a scheduled flight path (e.g., a predetermined flight path) and information regarding a delivery to be made by the drone. The information regarding the delivery may indicate a weight of a package to be delivered, a scheduled time of the delivery, an estimated amount of time to complete the delivery, an identity of a sender of the package, and an identity of a recipient of the package, and a location (e.g., GPS coordinates) of a destination to which the package is to be delivered.

It will be recognized that the offline-compatible node 500 may not include one or more of the storage logic 502, the connection logic 504, the determination logic 508, the store 510, and/or the offline support logic 514. Furthermore, the offline-compatible node 500 may include components in addition to or in lieu of the storage logic 502, the connection logic 504, the determination logic 508, the store 510, and/or the offline support logic 514.

Figure 6:
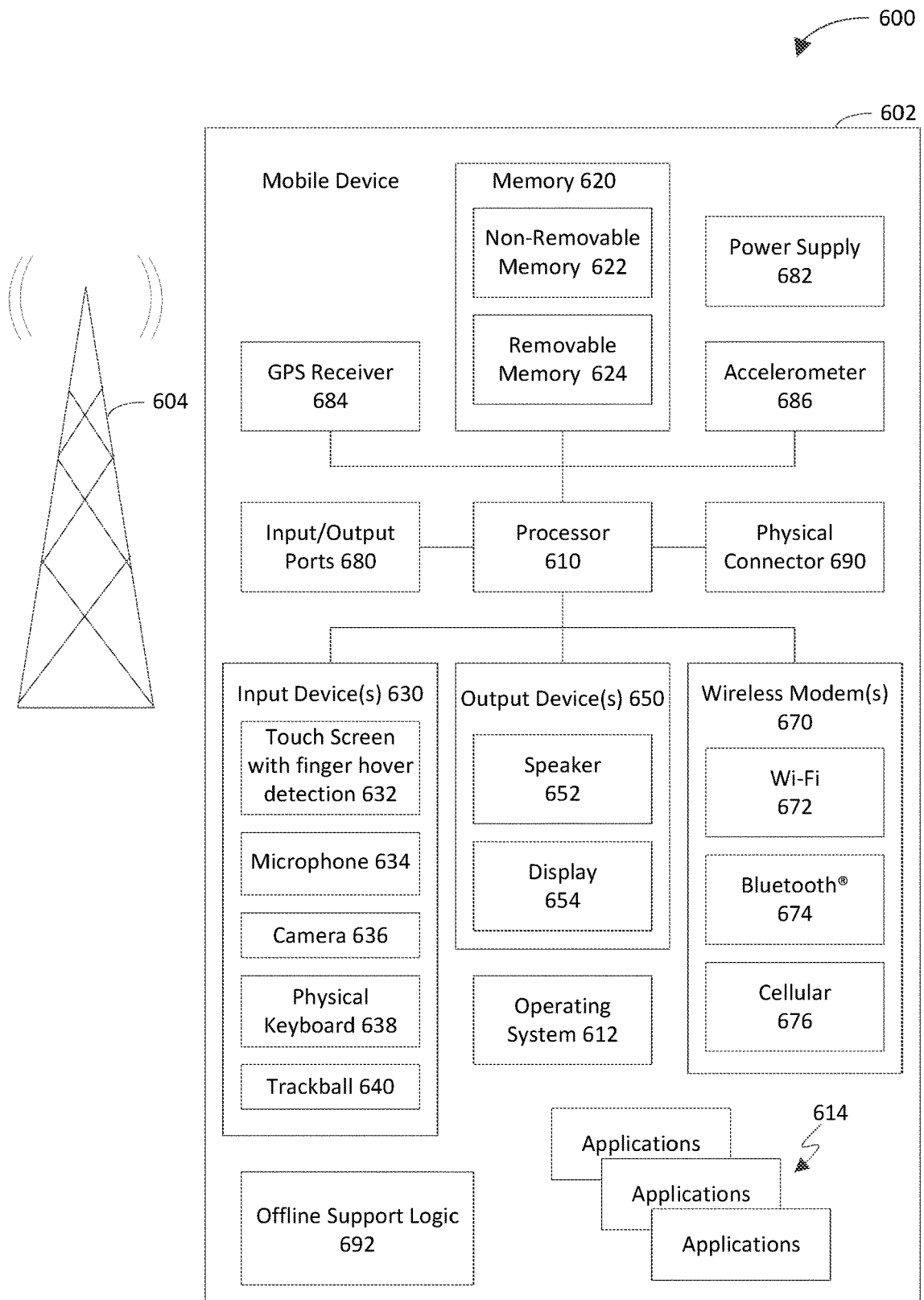
FIG. 6 is a system diagram of an exemplary mobile device in accordance with an embodiment.

FIG. 6 is a system diagram of an exemplary mobile device 600 including a variety of optional hardware and software components, shown generally as 602. Any components 602 in the mobile device may communicate with any other component, though not all connections are shown, for ease of illustration. The mobile device 600 may be any of a variety of computing devices (e.g., cell phone, smartphone, handheld computer, Personal Digital Assistant (PDA), etc.) and may allow wireless two-way communications with one or more mobile communications networks 604, such as a cellular or satellite network, or with a local area or wide area network.

The mobile device 600 may include a processor 610 (e.g., signal processor, microprocessor, ASIC, or other control and processing logic circuitry) for performing such tasks as signal coding, data processing, input/output processing, power control, and/or other functions. An operating system 612 may control the allocation and usage of the components 602 and support for one or more applications 614 (a.k.a. application programs). The applications 614 may include common mobile computing applications (e.g., email applications, calendars, contact managers, web browsers, messaging applications) and any other computing applications (e.g., word processing applications, mapping applications, media player applications).

The mobile device 600 may include memory 620. The memory 620 may include non-removable memory 622 and/or removable memory 624. The non-removable memory 622 may include RAM, ROM, flash memory, a hard disk, or other well-known memory storage technologies. The removable memory 624 may include flash memory or a Subscriber Identity Module (SIM) card, which is well known in GSM communication systems, or other well-known memory storage technologies, such as "smart cards." The memory 620 may store data and/or code for running the operating system 612 and the applications 614. Example data may include web pages, text, images, sound files, video data, or other data sets to be sent to and/or received from one or more network servers or other devices via one or more wired or wireless networks. Memory 620 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 600 may support one or more input devices 630, such as a touch screen 632, microphone 634, camera 636, physical keyboard 638 and/or trackball 640 and one or more output devices 650, such as a speaker 652 and a display 654. Touch screens, such as the touch screen 632, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 632 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

The mobile device 600 may include offline support logic 692. The offline support logic 692 is configured to provide offline support for a database cluster in accordance with any one or more of the techniques described herein.

Other possible output devices (not shown) may include piezoelectric or other haptic output devices. Some devices may serve more than one input/output function. For example, touch screen 632 and display 654 may be combined in a single input/output device. The input devices 630 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 612 or applications 614 may include speech-recognition software as part of a voice control interface that allows a user to operate the mobile device 600 via voice commands. Furthermore, the mobile device 600 may include input devices and software that allows for user interaction via a user's spatial gestures, such as detecting and interpreting gestures to provide input to a gaming application.

Wireless modem(s) 670 may be coupled to antenna(s) (not shown) and may support two-way communications between the processor 610 and external devices, as is well understood in the art. The modem(s) 670 are shown generically and may include a cellular modem 676 for communicating with the mobile communication network 604 and/or other radio-based modems (e.g., Bluetooth® 674 and/or Wi-Fi 672). At least one of the wireless modem(s) 670 is typically configured for communication with one or more cellular networks, such as a GSM network for data and voice communications within a single cellular network, between cellular networks, or between the mobile device and a public switched telephone network (PSTN).

The mobile device may further include at least one input/output port 680, a power supply 682, a satellite navigation system receiver 684, such as a Global Positioning System (GPS) receiver, an accelerometer 686, and/or a physical connector 690, which may be a USB port, IEEE 1394 (FireWire) port, and/or RS-232 port. The illustrated components 602 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the offline support logic 114, the storage logic 302, the connection logic 304, the operation logic 306, the determination logic 308, the store 310, the offline support logic 314, the storage logic 502, the connection logic 504, the determination logic 508, the store 510, the offline support logic 514, flowchart 200, and/or flowchart 400 may be implemented in hardware, software, firmware, or any combination thereof.

For example, any one or more of the offline support logic 114, the storage logic 302, the connection logic 304, the operation logic 306, the determination logic 308, the store 310, the offline support logic 314, the storage logic 502, the connection logic 504, the determination logic 508, the store 510, the offline support logic 514, flowchart 200, and/or flowchart 400 may be implemented, at least in part, as computer program code configured to be executed in one or more processors.

In another example, any one or more of the offline support logic 114, the storage logic 302, the connection logic 304, the operation logic 306, the determination logic 308, the store 310, the offline support logic 314, the storage logic 502, the connection logic 504, the determination logic 508, the store 510, the offline support logic 514, flowchart 200, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example offline-compatible node to provide offline support for a database cluster that includes a plurality of nodes and the offline-compatible node, which are configured to be interconnected via a network, comprises a memory and one or more processors coupled to the memory. The one or more processors are configured to store first information in the memory of the offline-compatible node, which is included in the database cluster that further includes the plurality of nodes that are configured to be synchronized with each other to store a plurality of respective instances of second information, while the offline-compatible node is temporarily not connected to the plurality of nodes via the network. The one or more processors are further configured to connect the offline-compatible node to the plurality of nodes via the network in response to the offline-compatible node not being connected to the plurality of nodes via the network. The one or more processors are further configured to perform an operation with regard to the first information based at least in part on the offline-compatible node being connected to the plurality of nodes via the network.

In a first aspect of the first example offline-compatible node, the one or more processors are configured to perform a CRUD operation on the first information stored in the memory of the offline-compatible node based at least in part on the offline-compatible node being connected to the plurality of nodes via the network.

In an implementation of the first aspect, the one or more processors are configured to delete at least one of an entry or a table from the first information stored in the memory of the offline-compatible node based at least in part on the offline-compatible node being connected to the plurality of nodes via the network.

In a second aspect of the first example offline-compatible node, the one or more processors are configured to cause a CRUD operation to be performed on the second information stored by the plurality of nodes based at least in part on the offline-compatible node being connected to the plurality of nodes via the network. The second aspect of the first example offline-compatible node may be implemented in combination with the first aspect of the first example offline-compatible node, though the example embodiments are not limited in this respect.

In a third aspect of the first example offline-compatible node, the one or more processors are configured to perform an algorithm on at least the first information to generate derived information. In accordance with the third aspect, the one or more processors are configured to cause the derived information to be stored in at least one of the memory of the offline-compatible node or one or more memories of one or more respective nodes of the plurality of nodes based at least in part on the offline-compatible node being connected to the plurality of nodes via the network. The third aspect of the first example offline-compatible node may be implemented in combination with the first and/or second aspect of the first example offline-compatible node, though the example embodiments are not limited in this respect.

In a first implementation of the third aspect, the one or more processors are configured to perform the algorithm on at least the first information and at least a portion of the second information that is stored by the plurality of nodes to generate the derived information.

In a second implementation of the third aspect, the one or more processors are configured to perform a mathematical algorithm on at least the first information to generate the derived information.

In a fourth aspect of the first example offline-compatible node, the one or more processors are configured to replicate the first information to one or more nodes of the plurality of nodes by causing the one or more nodes to store one or more respective instances of the first information based at least in part on the offline-compatible node being connected to the plurality of nodes via the network. The fourth aspect of the first example offline-compatible node may be implemented in combination with the first, second, and/or third aspect of the first example offline-compatible node, though the example embodiments are not limited in this respect.

In a fifth aspect of the first example offline-compatible node, a database schema of a database with which the database cluster is associated defines the offline-compatible node to be capable of performing the operation with regard to the first information as a result of the offline-compatible node being connected to the plurality of nodes via the network. In accordance with the fifth aspect, the one or more processors are configured to perform the operation with regard to the first information based at least in part on the database schema of the database defining the offline-compatible node to be capable of performing the operation with regard to the first information as a result of the offline-compatible node being connected to the plurality of nodes via the network. The fifth aspect of the first example offline-compatible node may be implemented in combination with the first, second, third, and/or fourth aspect of the first example offline-compatible node, though the example embodiments are not limited in this respect.

In a sixth aspect of the first example offline-compatible node, instructions that are executed against a database with which the database cluster is associated define the offline-compatible node to be capable of performing the operation with regard to the first information as a result of the offline-compatible node being connected to the plurality of nodes via the network. In accordance with the sixth aspect, the one or more processors are configured to perform the operation with regard to the first information based at least in part on the instructions that are executed against the database defining the offline-compatible node to be capable of performing the operation with regard to the first information as a result of the offline-compatible node being connected to the plurality of nodes via the network. The sixth aspect of the first example offline-compatible node may be implemented in combination with the first, second, third, fourth, and/or fifth aspect of the first example offline-compatible node, though the example embodiments are not limited in this respect.

In a seventh aspect of the first example offline-compatible node, the one or more processors are configured to delete the first information from the offline-compatible node based at least in part on knowledge that the offline-compatible node is to become disconnected from the plurality of nodes via the network in response to causing the one or more nodes to store the one or more respective instances of the first information. The seventh aspect of the first example offline-compatible node may be implemented in combination with the first, second, third, fourth, fifth, and/or sixth aspect of the first example offline-compatible node, though the example embodiments are not limited in this respect.

In an eighth aspect of the first example offline-compatible node, a specified node is chosen from a corpus of nodes of the database cluster to be the offline-compatible node based at least in part on a use-case of the database cluster. The eighth aspect of the first example offline-compatible node may be implemented in combination with the first, second, third, fourth, fifth, sixth, and/or seventh aspect of the first example offline-compatible node, though the example embodiments are not limited in this respect.

In a ninth aspect of the first example offline-compatible node, the one or more processors are configured to determine whether the operation is to be performed with regard to the first information based at least in part on a use-case of the database cluster. In accordance with the ninth aspect, a first use-case of the database cluster indicates that the operation is to be performed with regard to the first information, and a second use-case of the database cluster indicates that the operation is not to be performed with regard to the first information. In further accordance with the ninth aspect, the one or more processors are configured to perform the operation with regard to the first information based at least in part on the use-case of the database cluster being the first use-case. The ninth aspect of the first example offline-compatible node may be implemented in combination with the first, second, third, fourth, fifth, sixth, seventh, and/or eighth aspect of the first example offline-compatible node, though the example embodiments are not limited in this respect.

A second example offline-compatible node to provide offline support for a database cluster that includes a plurality of nodes and the offline-compatible node, which are configured to be interconnected via a network, comprises a memory and one or more processors coupled to the memory. The one or more processors are configured to store first information in the memory of the offline-compatible node, which is included in the database cluster that further includes the plurality of nodes that are configured to be synchronized with each other to store a plurality of respective instances of second information, while the offline-compatible node is temporarily not connected to the plurality of nodes via the network. The one or more processors are further configured to connect the offline-compatible node to the plurality of nodes via the network in response to the offline-compatible node not being connected to the plurality of nodes via the network. The one or more processors are further configured to replicate the first information to one or more nodes of the plurality of nodes in the database cluster by causing the one or more nodes to store one or more respective instances of the first information based at least in part on the offline-compatible node being connected to the plurality of nodes via the network.

In a first aspect of the second example offline-compatible node, the one or more processors are configured to change an information portion that is stored in the memory of the offline-compatible node while the offline-compatible node is temporarily not connected to the plurality of nodes via the network to provide the first information. In accordance with the first aspect, the information portion is a portion of the second information stored by the plurality of nodes. In further accordance with the first aspect, the one or more processors are configured to cause the one or more nodes of the plurality of nodes in the database cluster to replace one or more respective instances of the portion in the one or more respective instances of the second information that are stored by the one or more respective nodes with the one or more respective instances of the first information based at least in part on the offline-compatible node being connected to the plurality of nodes via the network.

In a first implementation of the first aspect, a database schema of a database with which the database cluster is associated defines the offline-compatible node to be capable of changing the information portion that is stored in the memory of the offline-compatible node while the offline-compatible node is temporarily not connected to the plurality of nodes via the network to provide the first information. In accordance with the first implementation, the database schema specifies that the one or more instances of the portion in the one or more respective instances of the second information that are stored by the one or more respective nodes are to be replaced with the one or more respective instances of the first information in response to the offline-compatible node being connected to the plurality of nodes via the network.

In a second implementation of the first aspect, the one or more processors are configured to change the information portion that is stored in the memory of the offline-compatible node while the offline-compatible node is temporarily not connected to the plurality of nodes via the network to provide the first information based at least in part on instructions that are executed against a database with which the database cluster is associated defining the offline-compatible node to be capable of changing the information portion that is stored in the memory of the offline-compatible node while the offline-compatible node is temporarily not connected to the plurality of nodes via the network. In accordance with the second implementation, the one or more processors are configured to cause the one or more nodes of the plurality of nodes in the database cluster to replace the one or more respective instances of the portion in the one or more respective instances of the second information that are stored by the one or more respective nodes with the one or more respective instances of the first information based at least in part on the instructions specifying that the one or more instances of the portion in the one or more respective instances of the second information that are stored by the one or more respective nodes are to be replaced with the one or more respective instances of the first information in response to the offline-compatible node being connected to the plurality of nodes via the network.

In a second aspect of the second example offline-compatible node, the one or more processors are configured to not cause each node of the plurality of nodes that is not included among the one or more nodes to store a respective instance of the first information in response to the offline-compatible node being connected to the plurality of nodes via the network. The second aspect of the second example offline-compatible node may be implemented in combination with the first aspect of the second example offline-compatible node, though the example embodiments are not limited in this respect.

In a third aspect of the second example offline-compatible node, the one or more processors are configured to delete the first information from the memory of the offline-compatible node based at least in part on knowledge that the offline-compatible node is to become disconnected from the plurality of nodes via the network in response to causing the one or more nodes to store the one or more respective instances of the first information. The third aspect of the second example offline-compatible node may be implemented in combination with the first and/or second aspect of the second example offline-compatible node, though the example embodiments are not limited in this respect.

In a fourth aspect of the second example offline-compatible node, the one or more processors are configured to determine whether the first information stored in the memory of the offline-compatible node is to be replicated to the one or more nodes based at least in part on a use-case of the database cluster. In accordance with the fourth aspect, a first use-case of the database cluster indicates that the first information stored in the memory of the offline-compatible node is to be replicated to the one or more nodes, and a second use-case of the database cluster indicates that the first information stored in the memory of the offline-compatible node is not to be replicated to the one or more nodes. In further accordance with the fourth aspect of the second example offline-compatible node, the one or more processors are configured to cause the one or more nodes of the plurality of nodes to store the one or more respective instances of the first information based at least in part on the use-case of the database cluster being the first use-case. The fourth aspect of the second example offline-compatible node may be implemented in combination with the first, second, and/or third aspect of the second example offline-compatible node, though the example embodiments are not limited in this respect.

In a fifth aspect of the second example offline-compatible node, at least one of (1) a database schema of a database with which the database cluster is associated or (2) instructions that are executed against the database indicate that information stored in the memory of the offline-compatible node has priority over information stored by the plurality of nodes. In accordance with the fifth aspect, the one or more processors are configured to cause the one or more nodes of the plurality of nodes to store the one or more respective instances of the first information based at least in part on the at least one of the database schema or the instructions indicating that the information stored by the offline-compatible node has priority over the information stored by the plurality of nodes. The fifth aspect of the second example offline-compatible node may be implemented in combination with the first, second, third, and/or fourth aspect of the second example offline-compatible node, though the example embodiments are not limited in this respect.

In a sixth aspect of the second example offline-compatible node, the one or more processors are configured to cause the one or more nodes of the plurality of nodes in the database cluster to store the one or more respective instances of the first information in addition to the one or more respective instances of the second information based at least in part on the offline-compatible node being connected to the plurality of nodes via the network. The sixth aspect of the second example offline-compatible node may be implemented in combination with the first, second, third, fourth, and/or fifth aspect of the second example offline-compatible node, though the example embodiments are not limited in this respect.

A third example offline-compatible node to provide offline support for a database cluster that includes a plurality of nodes and the offline-compatible node, which are configured to be interconnected via a network, comprises a memory and one or more processors coupled to the memory. The one or more processors are configured to connect the offline-compatible node to the plurality of nodes, which are configured to be synchronized with each other to store a plurality of respective instances of first information, via the network in response to the offline-compatible node being temporarily not connected to the plurality of nodes via the network. The one or more processors are further configured to receive an information portion, which is a portion of the first information of which storage by the plurality of nodes is initiated while the offline-compatible node is not connected to the plurality of nodes via the network, by the offline-compatible node from a first node of the plurality of nodes based at least in part on the offline-compatible node being connected to the plurality of nodes via the network, the portion of the first information including less than all of the first information. The one or more processors are further configured to initiate storage of the information portion in the memory of the offline-compatible node based at least in part on the offline-compatible node being connected to the plurality of nodes via the network.

In a first aspect of the third example offline-compatible node, the memory of the offline-compatible node is configured to store second information while the offline-compatible node is temporarily not connected to the plurality of nodes via the network. In accordance with the first aspect, the one or more processors are configured to replace the second information that is stored in the memory of the offline-compatible node with the information portion based at least in part on the offline-compatible node being connected to the plurality of nodes via the network.

In a first implementation of the first aspect, a database schema of a database with which the database cluster is associated defines the offline-compatible node to be capable of being temporarily not connected to the plurality of nodes via the network and to be further capable of being connected to the plurality of nodes in response to the offline-compatible node being temporarily not connected to the plurality of nodes via the network. In accordance with the first implementation, the database schema specifies that the second information that is stored by the offline-compatible node is to be replaced with the information portion in response to the offline-compatible node being connected to the plurality of nodes via the network.

In a second implementation of the first aspect, the one or more processors are configured to replace the second information that is stored in the memory of the offline-compatible node with the information portion based at least in part on instructions that are executed against a database with which the database cluster is associated defining the offline-compatible node to be capable of being temporarily not connected to the plurality of nodes via the network and to be further capable of being connected to the plurality of nodes in response to the offline-compatible node being temporarily not connected to the plurality of nodes via the network and further based at least in part on the instructions specifying that the second information that is stored by the offline-compatible node is to be replaced with the information portion in response to the offline-compatible node being connected to the plurality of nodes via the network.

In a third implementation of the first aspect, at least one of (1) a database schema of a database with which the database cluster is associated or (2) instructions that are executed against the database indicate that information stored by the plurality of nodes has priority over information stored by the offline-compatible node. In accordance with the third implementation, the one or more processors are configured to replace the second information that is stored in the memory of the offline-compatible node with the information portion based at least in part on the at least one of the database schema or the instructions indicating that the information stored by the plurality of nodes has priority over the information stored by the offline-compatible node.

In a second aspect of the third example offline-compatible node, the one or more processors are configured to determine whether the information portion is to be replicated from the plurality of nodes to the offline-compatible node based at least in part on a use-case of the database cluster. In accordance with the second aspect, a first use-case of the database cluster indicates that the information portion is to be replicated from the plurality of nodes to the offline-compatible node, and a second use-case of the database cluster indicates that the information portion is not to be replicated from the plurality of nodes to the offline-compatible node. In further accordance with the second aspect, the one or more processors are configured to initiate the storage of the information portion in the memory of the offline-compatible node based at least in part on the use-case of the database cluster being the first use-case. The second aspect of the third example offline-compatible node may be implemented in combination with the first aspect of the third example offline-compatible node, though the example embodiments are not limited in this respect.

In a third aspect of the third example offline-compatible node, the memory of the offline-compatible node is configured to store second information while the offline-compatible node is temporarily not connected to the plurality of nodes via the network. In accordance with the third aspect, the one or more processors are configured to cause the information portion to be stored in addition to the second information in the memory of the offline-compatible node based at least in part on the offline-compatible node being connected to the plurality of nodes via the network. The third aspect of the third example offline-compatible node may be implemented in combination with the second aspect of the third example offline-compatible node, though the example embodiments are not limited in this respect.

In a first example method of providing offline support for a database cluster that includes a plurality of nodes and an offline-compatible node that are configured to be interconnected via a network, first information is stored by the offline-compatible node, which is included in the database cluster that further includes the plurality of nodes that are configured to be synchronized with each other to store a plurality of respective instances of second information, while the offline-compatible node is temporarily not connected to the plurality of nodes via the network. The offline-compatible node is connected to the plurality of nodes via the network in response to the offline-compatible node not being connected to the plurality of nodes via the network. An operation is performed with regard to the first information based at least in part on the offline-compatible node being connected to the plurality of nodes via the network.

In a first aspect of the first example method, performing the operation with regard to the first information comprises performing a CRUD operation on the first information stored by the offline-compatible node based at least in part on the offline-compatible node being connected to the plurality of nodes via the network.

In an implementation of the first aspect, performing the operation with regard to the first information comprises deleting at least one of an entry or a table from the first information stored by the offline-compatible node based at least in part on the offline-compatible node being connected to the plurality of nodes via the network.

In a second aspect of the first example method, performing the operation with regard to the first information comprises causing a CRUD operation to be performed on the second information stored by the plurality of nodes based at least in part on the offline-compatible node being connected to the plurality of nodes via the network. The second aspect of the first example method may be implemented in combination with the first aspect of the first example method, though the example embodiments are not limited in this respect.

In a third aspect of the first example method, performing the operation with regard to the first information comprises performing an algorithm on at least the first information to generate derived information. In accordance with the third aspect, performing the operation with regard to the first information further comprises causing the derived information to be stored by at least one of the offline-compatible node or one or more nodes of the plurality of nodes based at least in part on the offline-compatible node being connected to the plurality of nodes via the network. The third aspect of the first example method may be implemented in combination with the first and/or second aspect of the first example method, though the example embodiments are not limited in this respect.

In a first implementation of the third aspect, performing the algorithm comprises performing the algorithm on at least the first information and at least a portion of the second information that is stored by the plurality of nodes to generate the derived information.

In a second implementation of the third aspect, performing the algorithm comprises performing a mathematical algorithm on at least the first information to generate the derived information.

In a fourth aspect of the first example method, performing the operation with regard to the first information comprises replicating the first information to one or more nodes of the plurality of nodes by causing the one or more nodes to store one or more respective instances of the first information based at least in part on the offline-compatible node being connected to the plurality of nodes via the network. The fourth aspect of the first example method may be implemented in combination with the first, second, and/or third aspect of the first example method, though the example embodiments are not limited in this respect.

In a fifth aspect of the first example method, a database schema of a database with which the database cluster is associated defines the offline-compatible node to be capable of performing the operation with regard to the first information as a result of the offline-compatible node being connected to the plurality of nodes via the network. In accordance with the fifth aspect, performing the operation with regard to the first information comprises performing the operation with regard to the first information based at least in part on the database schema of the database defining the offline-compatible node to be capable of performing the operation with regard to the first information as a result of the offline-compatible node being connected to the plurality of nodes via the network. The fifth aspect of the first example method may be implemented in combination with the first, second, third, and/or fourth aspect of the first example method, though the example embodiments are not limited in this respect.

In a sixth aspect of the first example method, instructions that are executed against a database with which the database cluster is associated define the offline-compatible node to be capable of performing the operation with regard to the first information as a result of the offline-compatible node being connected to the plurality of nodes via the network. In accordance with the sixth aspect, performing the operation with regard to the first information comprises performing the operation with regard to the first information based at least in part on the instructions that are executed against the database defining the offline-compatible node to be capable of performing the operation with regard to the first information as a result of the offline-compatible node being connected to the plurality of nodes via the network. The sixth aspect of the first example method may be implemented in combination with the first, second, third, fourth, and/or fifth aspect of the first example method, though the example embodiments are not limited in this respect.

In a seventh aspect of the first example method, the first example method further comprises deleting the first information from the offline-compatible node based at least in part on knowledge that the offline-compatible node is to become disconnected from the plurality of nodes via the network in response to causing the one or more nodes to store the one or more respective instances of the first information. The seventh aspect of the first example method may be implemented in combination with the first, second, third, fourth, fifth, and/or sixth aspect of the first example method, though the example embodiments are not limited in this respect.

In an eighth aspect of the first example method, a specified node is chosen from a corpus of nodes of the database cluster to be the offline-compatible node based at least in part on a use-case of the database cluster. The eighth aspect of the first example method may be implemented in combination with the first, second, third, fourth, fifth, sixth, and/or seventh aspect of the first example method, though the example embodiments are not limited in this respect.

In a ninth aspect of the first example method, the first example method further comprises determining whether the operation is to be performed with regard to the first information based at least in part on a use-case of the database cluster. In accordance with ninth aspect, a first use-case of the database cluster indicates that the operation is to be performed with regard to the first information, and a second use-case of the database cluster indicates that the operation is not to be performed with regard to the first information. In further accordance with the ninth aspect, performing the operation with regard to the first information comprises performing the operation with regard to the first information based at least in part on the use-case of the database cluster being the first use-case. The ninth aspect of the first example method may be implemented in combination with the first, second, third, fourth, fifth, sixth, seventh, and/or eighth aspect of the first example method, though the example embodiments are not limited in this respect.

In a second example method of providing offline support for a database cluster that includes a plurality of nodes and an offline-compatible node that are configured to be interconnected via a network, first information is stored by the offline-compatible node, which is included in the database cluster that further includes the plurality of nodes that are configured to be synchronized with each other to store a plurality of respective instances of second information, while the offline-compatible node is temporarily not connected to the plurality of nodes via the network. The offline-compatible node is connected to the plurality of nodes via the network in response to the offline-compatible node not being connected to the plurality of nodes via the network. The first information is replicated to one or more nodes of the plurality of nodes in the database cluster by causing the one or more nodes to store one or more respective instances of the first information based at least in part on the offline-compatible node being connected to the plurality of nodes via the network.

In a first aspect of the second example method, the second example method further comprises changing an information portion that is stored by the offline-compatible node while the offline-compatible node is temporarily not connected to the plurality of nodes via the network to provide the first information. In accordance with the first aspect, the information portion is a portion of the second information stored by the plurality of nodes. In further accordance with the first aspect, replicating the first information to the one or more nodes comprises causing the one or more nodes of the plurality of nodes in the database cluster to replace one or more respective instances of the portion in the one or more respective instances of the second information that are stored by the one or more respective nodes with the one or more respective instances of the first information based at least in part on the offline-compatible node being connected to the plurality of nodes via the network.

In a first implementation of the first aspect, a database schema of a database with which the database cluster is associated defines the offline-compatible node to be capable of changing the information portion that is stored by the offline-compatible node while the offline-compatible node is temporarily not connected to the plurality of nodes via the network to provide the first information. In accordance with the first implementation, the database schema specifies that the one or more instances of the portion in the one or more respective instances of the second information that are stored by the one or more respective nodes are to be replaced with the one or more respective instances of the first information in response to the offline-compatible node being connected to the plurality of nodes via the network.

In a second implementation of the first aspect, changing the information portion that is stored by the offline-compatible node while the offline-compatible node is temporarily not connected to the plurality of nodes via the network comprises changing the information portion that is stored by the offline-compatible node while the offline-compatible node is temporarily not connected to the plurality of nodes via the network to provide the first information based at least in part on instructions that are executed against a database with which the database cluster is associated defining the offline-compatible node to be capable of changing the information portion that is stored by the offline-compatible node while the offline-compatible node is temporarily not connected to the plurality of nodes via the network. In accordance with the second implementation, causing the one or more nodes of the plurality of nodes in the database cluster to replace the one or more respective instances of the portion in the one or more respective instances of the second information that are stored by the one or more respective nodes with the one or more respective instances of the first information comprises causing the one or more nodes of the plurality of nodes in the database cluster to replace the one or more respective instances of the portion in the one or more respective instances of the second information that are stored by the one or more respective nodes with the one or more respective instances of the first information based at least in part on the instructions specifying that the one or more instances of the portion in the one or more respective instances of the second information that are stored by the one or more respective nodes are to be replaced with the one or more respective instances of the first information in response to the offline-compatible node being connected to the plurality of nodes via the network.

In a second aspect of the second example method, replicating the first information to the one or more nodes comprises not causing each node of the plurality of nodes that is not included among the one or more nodes to store a respective instance of the first information in response to the offline-compatible node being connected to the plurality of nodes via the network. The second aspect of the second example method may be implemented in combination with the first aspect of the second example method, though the example embodiments are not limited in this respect.

In a third aspect of the second example method, the second example method further comprises deleting the first information from the offline-compatible node based at least in part on knowledge that the offline-compatible node is to become disconnected from the plurality of nodes via the network in response to causing the one or more nodes to store the one or more respective instances of the first information. The third aspect of the second example method may be implemented in combination with the first and/or second aspect of the second example method, though the example embodiments are not limited in this respect.

In a fourth aspect of the second example method, a specified node is chosen from a corpus of nodes of the database cluster to be the offline-compatible node based at least in part on a use-case of the database cluster. The fourth aspect of the second example method may be implemented in combination with the first, second, and/or third aspect of the second example method, though the example embodiments are not limited in this respect.

In a fifth aspect of the second example method, the second example method further comprises determining whether the first information stored by the offline-compatible node is to be replicated to the one or more nodes based at least in part on a use-case of the database cluster. In accordance with the fifth aspect, a first use-case of the database cluster indicates that the first information stored by the offline-compatible node is to be replicated to the one or more nodes, and a second use-case of the database cluster indicates that the first information stored by the offline-compatible node is not to be replicated to the one or more nodes. In further accordance with the fifth aspect, replicating the first information to the one or more nodes comprises causing the one or more nodes of the plurality of nodes to store the one or more respective instances of the first information based at least in part on the use-case of the database cluster being the first use-case. The fifth aspect of the second example method may be implemented in combination with the first, second, third, and/or fourth aspect of the second example method, though the example embodiments are not limited in this respect.

In a sixth aspect of the second example method, at least one of (1) a database schema of a database with which the database cluster is associated or (2) instructions that are executed against the database indicate that information stored by the offline-compatible node has priority over information stored by the plurality of nodes. In accordance with the sixth aspect, replicating the first information to the one or more nodes comprises causing the one or more nodes of the plurality of nodes to store the one or more respective instances of the first information based at least in part on the at least one of the database schema or the instructions indicating that the information stored by the offline-compatible node has priority over the information stored by the plurality of nodes. The sixth aspect of the second example method may be implemented in combination with the first, second, third, fourth, and/or fifth aspect of the second example method, though the example embodiments are not limited in this respect.

In a seventh aspect of the second example method, replicating the first information to the one or more nodes comprises causing the one or more nodes of the plurality of nodes in the database cluster to store the one or more respective instances of the first information in addition to the one or more respective instances of the second information based at least in part on the offline-compatible node being connected to the plurality of nodes via the network. The seventh aspect of the second example method may be implemented in combination with the first, second, third, fourth, fifth, and/or sixth aspect of the second example method, though the example embodiments are not limited in this respect.

In a third example method of providing offline support for a database cluster that includes a plurality of nodes and an offline-compatible node that are configured to be interconnected via a network, the offline-compatible node is connected to the plurality of nodes, which are configured to be synchronized with each other to store a plurality of respective instances of first information, via the network in response to the offline-compatible node being temporarily not connected to the plurality of nodes via the network. An information portion, which is a portion of the first information of which storage by the plurality of nodes is initiated while the offline-compatible node is not connected to the plurality of nodes via the network, is received by the offline-compatible node from a first node of the plurality of nodes based at least in part on the offline-compatible node being connected to the plurality of nodes via the network. The portion of the first information includes less than all of the first information. Storage of the information portion by the offline-compatible node is initiated based at least in part on the offline-compatible node being connected to the plurality of nodes via the network.

In a first aspect of the third example method, the third example method further comprises storing second information by the offline-compatible node while the offline-compatible node is temporarily not connected to the plurality of nodes via the network. In accordance with the first aspect, initiating the storage of the information portion by the offline-compatible node comprises replacing the second information that is stored by the offline-compatible node with the information portion based at least in part on the offline-compatible node being connected to the plurality of nodes via the network.

In a first implementation of the first aspect, a database schema of a database with which the database cluster is associated defines the offline-compatible node to be capable of being temporarily not connected to the plurality of nodes via the network and to be further capable of being connected to the plurality of nodes in response to the offline-compatible node being temporarily not connected to the plurality of nodes via the network. In accordance with the first implementation, the database schema specifies that the second information that is stored by the offline-compatible node is to be replaced with the information portion in response to the offline-compatible node being connected to the plurality of nodes via the network.

In a second implementation of the first aspect, replacing the second information that is stored by the offline-compatible node with the information portion comprises replacing the second information that is stored by the offline-compatible node with the information portion based at least in part on instructions that are executed against a database with which the database cluster is associated defining the offline-compatible node to be capable of being temporarily not connected to the plurality of nodes via the network and to be further capable of being connected to the plurality of nodes in response to the offline-compatible node being temporarily not connected to the plurality of nodes via the network and further based at least in part on the instructions specifying that the second information that is stored by the offline-compatible node is to be replaced with the information portion in response to the offline-compatible node being connected to the plurality of nodes via the network.

In a third implementation of the first aspect, at least one of (1) a database schema of a database with which the database cluster is associated or (2) instructions that are executed against the database indicate that information stored by the plurality of nodes has priority over information stored by the offline-compatible node. In accordance with the third implementation, replacing the second information that is stored by the offline-compatible node with the information portion comprises replacing the second information that is stored by the offline-compatible node with the information portion based at least in part on the at least one of the database schema or the instructions indicating that the information stored by the plurality of nodes has priority over the information stored by the offline-compatible node.

In a second aspect of the third example method, a specified node is chosen from a corpus of nodes of the database cluster to be the offline-compatible node based at least in part on a use-case of the database cluster. The second aspect of the third example method may be implemented in combination with the first aspect of the third example method, though the example embodiments are not limited in this respect.

In a third aspect of the third example method, the third example method further comprises determining whether the information portion is to be replicated from the plurality of nodes to the offline-compatible node based at least in part on a use-case of the database cluster. In accordance with the third aspect, a first use-case of the database cluster indicates that the information portion is to be replicated from the plurality of nodes to the offline-compatible node, and a second use-case of the database cluster indicates that the information portion is not to be replicated from the plurality of nodes to the offline-compatible node. In further accordance with the third aspect, initiating the storage of the information portion by the offline-compatible node comprises initiating the storage of the information portion by the offline-compatible node based at least in part on the use-case of the database cluster being the first use-case. The third aspect of the third example method may be implemented in combination with the first and/or second aspect of the third example method, though the example embodiments are not limited in this respect.

In a fourth aspect of the third example method, the second example method further comprises storing second information by the offline-compatible node while the offline-compatible node is temporarily not connected to the plurality of nodes via the network. In accordance with the fourth aspect, initiating the storage of the information portion by the offline-compatible node comprises storing the information portion in addition to the second information by the offline-compatible node based at least in part on the offline-compatible node being connected to the plurality of nodes via the network. The fourth aspect of the third example method may be implemented in combination with the second and/or third aspect of the third example method, though the example embodiments are not limited in this respect.

A first example computer program product comprises a computer-readable storage medium having instructions recorded thereon for enabling a processor-based offline-compatible node to perform operations to provide offline support for a database cluster that includes a plurality of nodes and the offline-compatible node, which are configured to be interconnected via a network. The operations comprise storing first information by the offline-compatible node, which is included in the database cluster that further includes the plurality of nodes that are configured to be synchronized with each other to store a plurality of respective instances of second information, while the offline-compatible node is temporarily not connected to the plurality of nodes via the network. The operations further comprise connecting the offline-compatible node to the plurality of nodes via the network in response to the offline-compatible node not being connected to the plurality of nodes via the network. The operations further comprise performing a task with regard to the first information based at least in part on the offline-compatible node being connected to the plurality of nodes via the network.

A second example computer program product comprises a computer-readable storage medium having instructions recorded thereon for enabling a processor-based offline-compatible node to perform operations to provide offline support for a database cluster that includes a plurality of nodes and the offline-compatible node, which are configured to be interconnected via a network. The operations comprise storing first information by the offline-compatible node, which is included in the database cluster that further includes the plurality of nodes that are configured to be synchronized with each other to store a plurality of respective instances of second information, while the offline-compatible node is temporarily not connected to the plurality of nodes via the network. The operations further comprise connecting the offline-compatible node to the plurality of nodes via the network in response to the offline-compatible node not being connected to the plurality of nodes via the network. The operations further comprise replicating the first information to one or more nodes of the plurality of nodes in the database cluster by causing the one or more nodes to store one or more respective instances of the first information based at least in part on the offline-compatible node being connected to the plurality of nodes via the network.

A third example computer program product comprises a computer-readable storage medium having instructions recorded thereon for enabling a processor-based offline-compatible node to perform operations to provide offline support for a database cluster that includes a plurality of nodes and the offline-compatible node, which are configured to be interconnected via a network. The operations comprise connecting the offline-compatible node to the plurality of nodes, which are configured to be synchronized with each other to store a plurality of respective instances of first information, via the network in response to the offline-compatible node being temporarily not connected to the plurality of nodes via the network. The operations further comprise receiving an information portion, which is a portion of the first information of which storage by the plurality of nodes is initiated while the offline-compatible node is not connected to the plurality of nodes via the network, by the offline-compatible node from a first node of the plurality of nodes based at least in part on the offline-compatible node being connected to the plurality of nodes via the network. The portion of the first information includes less than all of the first information. The operations further comprise initiating storage of the information portion by the offline-compatible node based at least in part on the offline-compatible node being connected to the plurality of nodes via the network.

IV. Example Computer System

Figure 7:
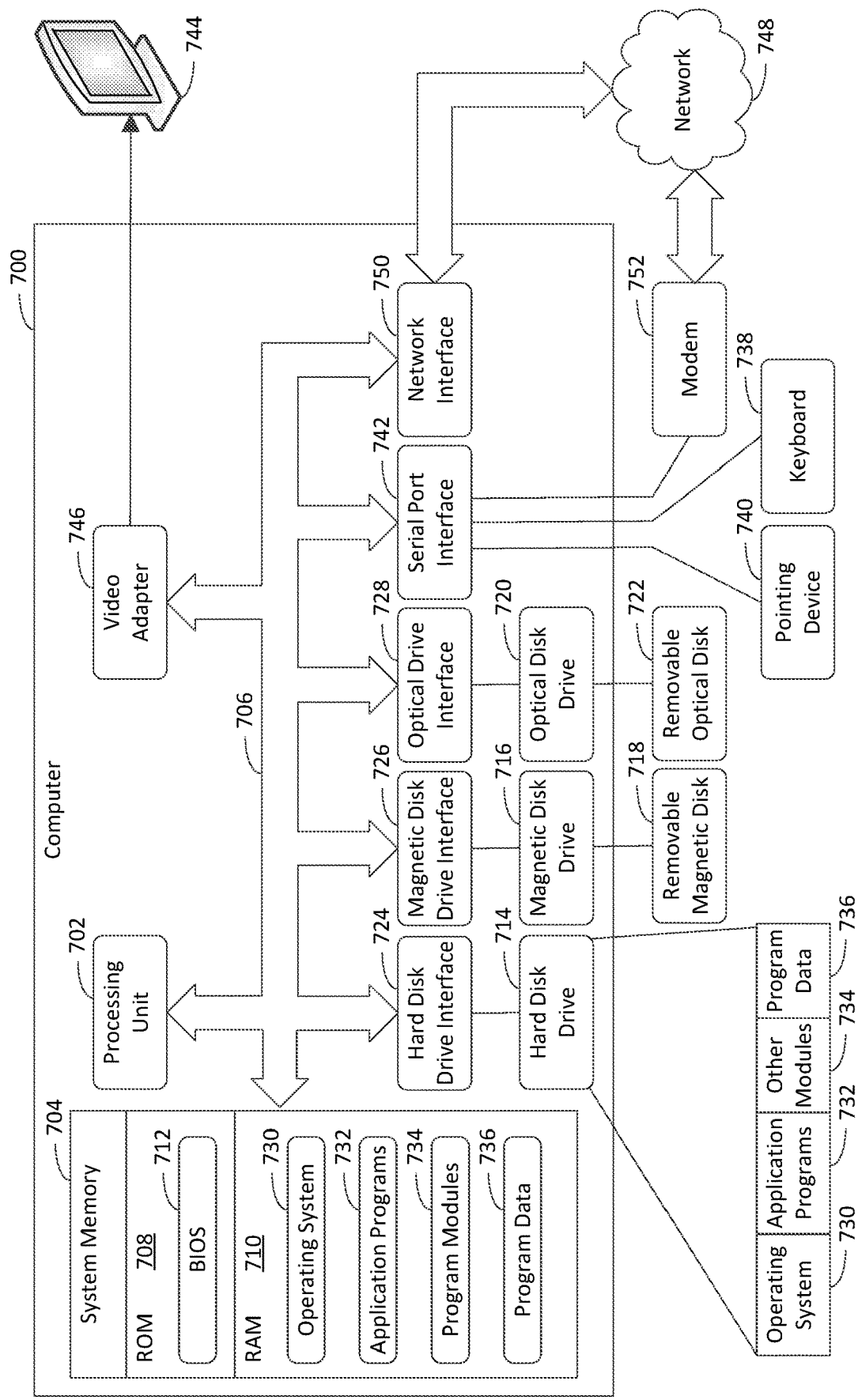
FIG. 7 depicts an example computer in which embodiments may be implemented.

FIG. 7 depicts an example computer 700 in which embodiments may be implemented. Any one or more of the user devices 102A-102M, any one or more of the nodes 106A-106N, any one or more of the online nodes 110, and/or the offline-compatible node 112 shown in FIG. 1; the offline-compatible node 300 shown in FIG. 3; and/or the offline-compatible node 500 shown in FIG. 5 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of the offline support logic 114, the storage logic 302, the connection logic 304, the operation logic 306, the determination logic 308, the offline support logic 314, the storage logic 502, the connection logic 504, the determination logic 508, the offline support logic 514, flowchart 200 (including any step of flowchart 200), and/or flowchart 400 (including any step of flowchart 400), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An offline-compatible node to provide offline support for a database cluster that includes a plurality of nodes and the offline-compatible node, which are configured to be interconnected via a network, the offline-compatible node comprising:
   memory; and
   one or more processors coupled to the memory, the one or more processors configured to:
      store first information in the memory of the offline-compatible node, which is included in the database cluster that further includes the plurality of nodes that are configured to be synchronized with each other to store a plurality of respective instances of second information, while the offline-compatible node is temporarily not connected to the plurality of nodes via the network;
      connect the offline-compatible node to the plurality of nodes via the network in response to the offline-compatible node not being connected to the plurality of nodes via the network;
      perform an operation with regard to the first information based at least in part on the offline-compatible node being connected to the plurality of nodes via the network, including cause the plurality of nodes to store a plurality of respective instances of the first information; and
      in response to causing the plurality of nodes to store the plurality of respective instances of the first information, delete the first information from the offline-compatible node based at least in part on knowledge that the offline-compatible node is to become disconnected from the plurality of nodes via the network.

2. The offline-compatible node of claim 1, wherein the one or more processors are configured to at least one of:
   perform a CRUD operation on the first information stored in the memory of the offline-compatible node based at least in part on the offline-compatible node being connected to the plurality of nodes via the network; or
   cause a CRUD operation to be performed on the second information stored by the plurality of nodes based at least in part on the offline-compatible node being connected to the plurality of nodes via the network;
   wherein a CRUD operation is a create, read, update, or delete operation.

3. The offline-compatible node of claim 2, wherein the one or more processors are configured to:
   delete at least one of an entry or a table from the first information stored in the memory of the offline-compatible node based at least in part on the offline-compatible node being connected to the plurality of nodes via the network.

4. The offline-compatible node of claim 1, wherein the one or more processors are configured to:
   perform an algorithm on at least the first information to generate derived information; and
   cause the derived information to be stored in at least one of the memory of the offline-compatible node or one or more memories of one or more respective nodes of the plurality of nodes based at least in part on the offline-compatible node being connected to the plurality of nodes via the network.

5. The offline-compatible node of claim 4, wherein the one or more processors are configured to:
   perform the algorithm on at least the first information and at least a portion of the second information that is stored by the plurality of nodes to generate the derived information.

6. The offline-compatible node of claim 4, wherein the one or more processors are configured to:
   perform a mathematical algorithm on at least the first information to generate the derived information.

7. The offline-compatible node of claim 1, wherein a database schema of a database with which the database cluster is associated defines the offline-compatible node to be capable of performing the operation with regard to the first information as a result of the offline-compatible node being connected to the plurality of nodes via the network; and
   wherein the one or more processors are configured to:
      perform the operation with regard to the first information based at least in part on the database schema of the database defining the offline-compatible node to be capable of performing the operation with regard to the first information as a result of the offline-compatible node being connected to the plurality of nodes via the network.

8. The offline-compatible node of claim 1, wherein instructions that are executed against a database with which the database cluster is associated define the offline-compatible node to be capable of performing the operation with regard to the first information as a result of the offline-compatible node being connected to the plurality of nodes via the network; and
   wherein the one or more processors are configured to:
      perform the operation with regard to the first information based at least in part on the instructions that are executed against the database defining the offline-compatible node to be capable of performing the operation with regard to the first information as a result of the offline-compatible node being connected to the plurality of nodes via the network.

9. The offline-compatible node of claim 1, wherein the one or more processors are configured to:
   determine whether the operation is to be performed with regard to the first information based at least in part on a use-case of the database cluster, wherein a first use-case of the database cluster indicates that the operation is to be performed with regard to the first information, wherein a second use-case of the database cluster indicates that the operation is not to be performed with regard to the first information; and
   perform the operation with regard to the first information based at least in part on the use-case of the database cluster being the first use-case.

10. The offline-compatible node of claim 9, wherein the first use-case indicates that the offline-compatible node is located on an airplane, on a drone, on a boat, or on a space craft.

11. A method of providing offline support for a database cluster that includes a plurality of nodes and an offline-compatible node that are configured to be interconnected via a network, the method comprising:
   changing an information portion that is stored by the offline-compatible node while the offline-compatible node is temporarily not connected to the plurality of nodes via the network to provide first information;
   storing the first information by the offline-compatible node, which is included in the database cluster that further includes the plurality of nodes that are configured to be synchronized with each other to store a plurality of respective instances of second information, while the offline-compatible node is temporarily not connected to the plurality of nodes via the network, wherein the information portion is a portion of the second information;

connecting the offline-compatible node to the plurality of nodes via the network in response to the offline-compatible node not being connected to the plurality of nodes via the network; and replicating the first information to at least one node of the plurality of nodes in the database cluster by causing the at least one node to replace at least one respective instance of the portion in at least one respective instance of the second information that is stored by the at least one respective node with at least one respective instance of the first information based at least in part on the offline-compatible node being connected to the plurality of nodes via the network;

wherein a database schema of a database with which the database cluster is associated defines the offline-compatible node to be capable of changing the information portion that is stored by the offline-compatible node while the offline-compatible node is temporarily not connected to the plurality of nodes via the network to provide the first information; and wherein the database schema specifies that the at least one instance of the portion in the at least one respective instance of the second information that is stored by the at least one respective node is to be replaced with the at least one respective instance of the first information in response to the offline-compatible node being connected to the plurality of nodes via the network.

12. The method of claim 11, further comprising:
determining whether the first information stored by the offline-compatible node is to be replicated to the at least one node based at least in part on a use-case of the database cluster, wherein a first use-case of the database cluster indicates that the first information stored by the offline-compatible node is to be replicated to the at least one node, wherein a second use-case of the database cluster indicates that the first information stored by the offline-compatible node is not to be replicated to the at least one node;

wherein replicating the first information to the at least one node comprises:
causing the at least one node of the plurality of nodes to store the at least one respective instance of the first information based at least in part on the use-case of the database cluster being the first use-case.

13. The method of claim 12, wherein the first use-case indicates that the offline-compatible node is located on an airplane, on a drone, on a boat, or on a space craft.

14. The method of claim 11, wherein a database schema of a database with which the database cluster is associated indicates that information stored by the offline-compatible node has priority over information stored by the plurality of nodes; and wherein replicating the first information to the at least one node comprises:
causing the at least one node of the plurality of nodes to store the at least one respective instance of the first information based at least in part on the database schema indicating that the information stored by the offline-compatible node has priority over the information stored by the plurality of nodes.

15. The method of claim 11, wherein instructions that are executed against a database with which the database cluster is associated indicate that information stored by the offline-compatible node has priority over information stored by the plurality of nodes; and wherein replicating the first information to the at least one node comprises:
causing the at least one node of the plurality of nodes to store the at least one respective instance of the first information based at least in part on the instructions indicating that the information stored by the offline-compatible node has priority over the information stored by the plurality of nodes.

16. An offline-compatible node to provide offline support for a database cluster that includes a plurality of nodes, which are configured to be synchronized with each other to store a plurality of respective instances of first information, and the offline-compatible node, which are configured to be interconnected via a network, the offline-compatible node comprising:

memory; and
one or more processors coupled to the memory, the one or more processors configured to:
initiate storage of second information in the memory of the offline-compatible node while the offline-compatible node is temporarily not connected to the plurality of nodes, which are configured to be synchronized with each other to store the plurality of respective instances of the first information, via the network;

connect the offline-compatible node to the plurality of nodes via the network in response to the offline-compatible node being temporarily not connected to the plurality of nodes via the network;

receive an information portion, which is a portion of the first information of which storage by the plurality of nodes is initiated while the offline-compatible node is not connected to the plurality of nodes via the network, by the offline-compatible node from a first node of the plurality of nodes based at least in part on the offline-compatible node being connected to the plurality of nodes via the network, the portion of the first information including less than all of the first information; and initiate storage of the information portion in the memory of the offline-compatible node, including replacing the second information of which storage in the memory of the offline-compatible node is initiated while the offline-compatible node is temporarily not connected to the plurality of nodes with the information portion, based at least in part on the offline-compatible node being connected to the plurality of nodes via the network.

17. The offline-compatible node of claim 16, wherein a database schema of a database with which the database cluster is associated defines the offline-compatible node to be capable of being temporarily not connected to the plurality of nodes via the network and to be further capable of being connected to the plurality of nodes in response to the offline-compatible node being temporarily not connected to the plurality of nodes via the network; and wherein the database schema specifies that the second information that is stored by the offline-compatible node is to be replaced with the information portion in response to the offline-compatible node being connected to the plurality of nodes via the network.

18. The offline-compatible node of claim 16, wherein the one or more processors are configured to:
- replace the second information that is stored in the memory of the offline-compatible node with the information portion based at least in part on instructions that are executed against a database with which the database cluster is associated defining the offline-compatible node to be capable of being temporarily not connected to the plurality of nodes via the network and to be further capable of being connected to the plurality of nodes in response to the offline-compatible node being temporarily not connected to the plurality of nodes via the network and further based at least in part on the instructions specifying that the second information that is stored by the offline-compatible node is to be replaced with the information portion in response to the offline-compatible node being connected to the plurality of nodes via the network.

19. The offline-compatible node of claim 16, wherein at least one of (1) a database schema of a database with which the database cluster is associated or (2) instructions that are executed against the database indicate that information stored by the plurality of nodes has priority over information stored by the offline-compatible node; and
- wherein the one or more processors are configured to:
  - replace the second information that is stored in the memory of the offline-compatible node with the information portion based at least in part on the at least one of the database schema or the instructions indicating that the information stored by the plurality of nodes has priority over the information stored by the offline-compatible node.

20. The offline-compatible node of claim 16, wherein the one or more processors are configured to:
- determine whether storage of the information in the memory is to be initiated based at least in part on a use-case of the database cluster, wherein a first use-case of the database cluster indicates that the storage of the information in the memory is to be initiated, wherein a second use-case of the database cluster indicates that the storage of the information in the memory is not to be initiated; and
- initiate the storage of the information portion in the memory of the offline-compatible node based at least in part on the use-case of the database cluster being the first use-case.

21. The offline-compatible node of claim 20, wherein the first use-case indicates that the offline-compatible node is located on an airplane, on a drone, on a boat, or on a space craft.

* * * * *